(12) United States Patent
Horiuchi et al.

(10) Patent No.: US 8,369,403 B2
(45) Date of Patent: Feb. 5, 2013

(54) IMAGE PROCESSING DEVICE AND IMAGE PROCESSING METHOD

(75) Inventors: Yuya Horiuchi, Kanagawa (JP); Shojiro Shibata, Kanagawa (JP); Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 12/530,872

(22) PCT Filed: Sep. 12, 2008

(86) PCT No.: PCT/JP2008/066911
§ 371 (c)(1),
(2), (4) Date: Sep. 11, 2009

(87) PCT Pub. No.: WO2009/035144
PCT Pub. Date: Mar. 19, 2009

(65) Prior Publication Data
US 2010/0046621 A1    Feb. 25, 2010

(30) Foreign Application Priority Data

Sep. 12, 2007  (JP) .................. 2007-236943
Sep. 12, 2007  (JP) .................. 2007-236945

(51) Int. Cl.
*H04N 7/12*   (2006.01)
(52) U.S. Cl. .................................. 375/240.12
(58) Field of Classification Search ............. 375/240.01–240.08, 240.1–240.18; 382/238
See application file for complete search history.

(56) References Cited

U.S. PATENT DOCUMENTS

| | | |
|---|---|---|
| 5,428,396 A | 6/1995 | Yagasaki et al. |
| 5,488,570 A | 1/1996 | Agarwal |
| 5,508,942 A | 4/1996 | Agarwal |
| 5,565,921 A | 10/1996 | Sasaki et al. |
| 5,604,494 A | 2/1997 | Murakami et al. |
| 5,703,646 A | 12/1997 | Oda |
| 5,721,589 A | 2/1998 | Murata |
| 5,805,228 A | 9/1998 | Proctor et al. |

(Continued)

FOREIGN PATENT DOCUMENTS

| | | |
|---|---|---|
| CN | 1656818 | 8/2005 |
| DE | 603 13 454 T2 | 1/2008 |

(Continued)

OTHER PUBLICATIONS

Kim C et al.: "Fast H.264 Intra-prediction mode selection using joint spatial and transform domain features", Journal of Visual Communication and Image Representation, Academic Press, Inc, US, vol. 17, No. 2, Apr. 1, 2006, pp. 291-310, XP024905093.

(Continued)

*Primary Examiner* — Andrew Lai
*Assistant Examiner* — Syed M Bokhari
(74) *Attorney, Agent, or Firm* — Frommer Lawrence & Haug LLP; William S. Frommer

(57) ABSTRACT

The present invention can suppress the decline in video quality during encoding. The present invention generates, for each of the nine intra image prediction modes preset according to the AVC standard, a difference image data item containing a difference value from pixels surrounding a process-target pixel. Then, an encoding device (10) ranks the intra image prediction modes depending on the sum of absolute difference (SAD), which is the sum of differences that is based on the sum of absolute values of each process-target pixel of the difference image data item and a preference order of offset[n] preset for the intra image prediction mode.

12 Claims, 17 Drawing Sheets

U.S. PATENT DOCUMENTS

| | | | |
|---|---|---|---|
| 5,870,145 | A | 2/1999 | Yada et al. |
| 5,933,532 | A | 8/1999 | Mihara |
| 6,011,589 | A | 1/2000 | Matsuura et al. |
| 6,100,931 | A | 8/2000 | Mihara |
| 6,101,276 | A | 8/2000 | Adiletta et al. |
| 6,163,573 | A | 12/2000 | Mihara |
| 6,337,879 | B1 | 1/2002 | Mihara et al. |
| 6,393,060 | B1 | 5/2002 | Jeong |
| 6,408,027 | B2 | 6/2002 | Mori et al. |
| 6,678,322 | B1 | 1/2004 | Mihara |
| 6,907,069 | B2 | 6/2005 | Matsuzaki et al. |
| 6,934,330 | B2 | 8/2005 | Sugiyama et al. |
| 7,286,715 | B2 | 10/2007 | Togashi et al. |
| 7,386,049 | B2 | 6/2008 | Garrido et al. |
| 7,688,891 | B2 | 3/2010 | Kondo et al. |
| 7,751,476 | B2 | 7/2010 | Tanizawa et al. |
| 7,925,107 | B2 | 4/2011 | Kim et al. |
| 2003/0039309 | A1 | 2/2003 | Mihara |
| 2003/0223495 | A1 | 12/2003 | Sun et al. |
| 2003/0223496 | A1 | 12/2003 | Sun et al. |
| 2003/0223645 | A1 | 12/2003 | Sun et al. |
| 2003/0231796 | A1 | 12/2003 | Caviedes |
| 2004/0022318 | A1 | 2/2004 | Garrido et al. |
| 2004/0057523 | A1 | 3/2004 | Koto et al. |
| 2005/0025249 | A1 | 2/2005 | Zhao et al. |
| 2005/0163215 | A1 | 7/2005 | Sugiyama et al. |
| 2005/0175094 | A1 | 8/2005 | Kitamura et al. |
| 2006/0215763 | A1 | 9/2006 | Morimoto et al. |
| 2007/0253479 | A1 | 11/2007 | Mukherjee |
| 2007/0263728 | A1 | 11/2007 | Yanagihara et al. |
| 2008/0101707 | A1 | 5/2008 | Mukherjee et al. |
| 2009/0116760 | A1 | 5/2009 | Boon et al. |

FOREIGN PATENT DOCUMENTS

| | | |
|---|---|---|
| DE | 60313454 D | 1/2008 |
| DE | 60313454 T2 | 1/2008 |
| EP | 1510078 | 3/2005 |
| EP | 1553782 | 7/2005 |
| EP | 1705920 | 9/2006 |
| EP | 1 746 843 | 1/2007 |
| JP | 4-114585 | 4/1992 |
| JP | 8-65677 | 3/1996 |
| JP | 09-294263 | 11/1997 |
| JP | 10-174098 | 6/1998 |
| JP | 2000-224587 | 8/2000 |
| JP | 3264043 | 12/2001 |
| JP | 2002 290914 | 10/2002 |
| JP | 3358620 | 10/2002 |
| JP | 2002-359853 | 12/2002 |
| JP | 3561962 | 6/2004 |
| JP | 2005-192232 | 7/2005 |
| JP | 2006-148419 | 6/2006 |
| JP | 2006-222555 | 8/2006 |
| JP | 2006-270437 | 10/2006 |
| JP | 2007-067469 | 3/2007 |
| JP | 4135427 | 6/2008 |
| KR | 10-2006-0115404 | 11/2006 |
| KR | 10-2007-0051807 | 5/2007 |
| TW | 241532 | 10/2005 |
| WO | WO 98/26602 | 6/1998 |
| WO | WO 03/101117 A1 | 12/2003 |
| WO | WO 2003/101117 B | 5/2004 |

OTHER PUBLICATIONS

Li Z G et al.: "Fast Mode Decision Algorithm for Intraprediction in H.264/AVC Video Coding", IEEE Transactions on Circuits and Systems for Video Technology, IEEE Service Center, Piscataway, NJ, US, vol. 15, No. 7, Jul. 1, 2005, pp. 813-822, XP011135306.

Jamil-Ur-Rehman et al.: "Fast intra prediction mode decision using parallel processing", Machine Learning and Cybernetics, 2005. Proceedings of 2005 International Conference on Guangzhou, China Aug. 18-21, 2005, Piscataway, NJ, USA,IEEE, Piscataway, NJ, USA, Aug. 18, 2005, pp. 5094-5098vol. 8, XP031887291.

Zhang Yong-Dong et al.: "Fast 4×4 intra-prediction mode selection for H.264", 2004 IEEE International Conference on Multimedia and Expo : Jun. 27-30, 2004, Taipei, Taiwan, IEEE Operations Center, Piscataway, NJ, vol. 2, Jun. 27, 2004, pp. 1151-1154, XP010771028.

FIG. 10

IMAGE PROCESSING DEVICE AND IMAGE PROCESSING METHOD

TECHNICAL FIELD

The present invention relates to an encoding device and method that detect, for example, what the previous encoding process used, such as a quantization matrix or a quantization parameter, on a predetermined unit basis.

BACKGROUND ART

Conventionally, when transferring video data between television broadcasting stations, or when copying video data using a plurality of video recorders (VTR devices), the video data encoded in MPEG (Moving picture experts group) format are decoded and then encoded again. Therefore, an encoder and a decoder need to be connected in series and in tandem.

And a so-called "back search" method is employed to reduce the deterioration of the quality of video caused by the repetition of encoding and decoding in the case of tandem connection.

Here, "back search" is a method to obtain a quantization step regarding a minimum value as an appropriate quantization step by using the characteristic that the sum of residues of Discrete Cosine Transfer (DCT) coefficient becomes the smallest when a quantization step used in the previous encoding process or a quantization step that is a multiple of the one used in the previous encoding process is used.

For example, as for the technique that uses "back search," a video data compression device is disclosed in Patent Document 1. The video data compression device prevents the deterioration of the quality of video caused by the repetition of encoding and decoding when an encoder and a decoder are connected in tandem: this device reproduces the quantization step of the previous encoding process in back search method, and uses the same quantization step and GOP (Group of pictures) phase as the previous process to encode an input video data.

On the other hand, these days, instead of MPEG format, AVC (Advanced Video Coding) standard is widely used, ranging from a low speed and low video quality usage, like a television phone of a cell phone, to a large capacity and high video quality moving pictures, like high definition television broadcasting. However, this uses a combination of algorithms, including motion compensation, inter frame prediction, DCT, and entropy encoding. This means that the standard has been revamped so that this requires about half the amount of data if the quality is the same as MPEG.

In the intra image encoding of AVC, in order to improve the efficiency of encoding, an intra image prediction method that predicts the value of a pixel in a macro block from surrounding pixels inside an image and encodes difference image data generated from the prediction was introduced. An AVC stream encoded by using only this intra image encoding method is referred to as AVC Intra, hereinafter. That is, in the case of AVC Intra, the input image is divided, during the encoding process, into a prediction image generated from the surrounding pixels and a difference, and then the difference is encoded.

Nine modes, including prediction from the upper pixels and prediction from the horizontal pixels, are prepared for the prediction image; a prediction mode is usually employed so that the sum of differences from the prediction image on a unit block basis (for example, 4×4 sample or the like) becomes the smallest.

Patent Document 1: Japanese Patent Publication No. H10-174098

However, according to the above-noted conventional method, the amount of generated codes during the encoding process are likely to decrease, but since the encoding process of AVC for the quantization portion is irreversible transformation, the quality of video drops as the encoding and decoding processes are repeated, because quantization distortion occurs on the original input image after the encoding and decoding processes. Especially if a different prediction mode from the one used in the previous encoding process is employed, quantization distortion occurs again due to the effect of the previous quantization distortion, which might eventually cause a problem that the quality of video decreases.

DISCLOSURE OF THE INVENTION

To solve the above problem, according to the present invention, an image processing device includes: a difference image data generation section that generates, for each of a plurality of predetermined intra image prediction modes, a difference image data item containing a difference value from pixels surrounding a process-target pixel; and a ranking section that ranks the intra image prediction modes depending on the sum of differences that is based on the sum of absolute values of each process-target pixel of the difference image data item and an preference order preset for the intra image prediction mode.

Accordingly, the image processing device can rank a specific intra image prediction mode high in terms of the preference order, and this makes it easier to select the specific intra image prediction mode. Since the intra image prediction mode used in the previous encoding process can be easily selected, the image processing device can suppress quantization distortion during dubbing.

Moreover, according to the present invention, an image processing method includes: a difference image data generation step of generating, for each of a plurality of predetermined intra image prediction modes, a difference image data item containing a difference value from pixels surrounding a process-target pixel; and a ranking step of ranking the intra image prediction modes depending on the sum of differences that is based on the sum of absolute values of each process-target pixel of the difference image data item and an preference order preset for the intra image prediction mode.

Accordingly, the image processing device can rank a specific intra image prediction mode high in terms of the preference order, and this makes it easier to select the specific intra image prediction mode. Since the intra image prediction mode used in the previous encoding process can be easily selected, the image processing device can suppress quantization distortion during dubbing.

According to the present invention, the image processing device can rank a specific intra image prediction mode high in terms of the preference order, and this makes it easier to select the specific intra image prediction mode. Since the intra image prediction mode used in the previous encoding process can be easily selected, the image processing device can suppress quantization distortion during dubbing. Thus, the image processing device and the image processing method that are capable of suppressing the decline in video quality can be realized.

BRIEF DESCRIPTION OF THE DRAWINGS

FIGS. 10 ($a$) to ($i$) are diagrams illustrating nine 4×4 Intra prediction modes.

BEST MODE FOR CARRYING OUT THE INVENTION

A best mode embodiment of the present invention (simply referred to as an embodiment of the present invention, hereinafter) will be described in detail with reference to the accompanying drawings in the following order.

(1) Overview of the present invention
(2) First embodiment of the present invention (Offset preference application process)
(3) Second embodiment of the present invention (Confirmation of an intra image prediction mode by back search)

(1) Overview of the Present Invention (1-1) Premise

Generally, since the encoding of AVC (Advanced Video Coding) is irreversible transformation, distortion occurs on an original baseband (Baseband) image after the encoding and decoding processes. Therefore, the quality of video drops due to the distortion as the encoding and decoding processes are repeated during dubbing or the like in the case of tandem connection, for example.

Therefore, according to the first embodiment of the present invention, when an image that has once undergone the encoding and decoding processes is encoded again, the intra image encoding of AVC reuses the following three parameters used in the previous encoding process to reduce the image distortion to the level at which only the arithmetic error of an encoder and a decoder are observed. This is one of the features.

(1) Intra image prediction mode
(2) Quantization matrix (Qmatrix)
(3) Quantization parameter (QP)

Among them, in a quantization matrix detection process of the first embodiment, the focus is especially put on (2); the focus is put on (3) in a quantization parameter detection process; the focus is put on (1) in an offset preference application process.

That is, when the dubbing process is carried out for Intra images of AVC, or AVC Intra, the quantization matrix Qmatrix, quantization parameter QP and intra image prediction mode used in the previous encoding process are detected, and the same Qmatrix and QP are used to prevent quantization rounding, thereby improving the quality of dubbing.

Figure 1:
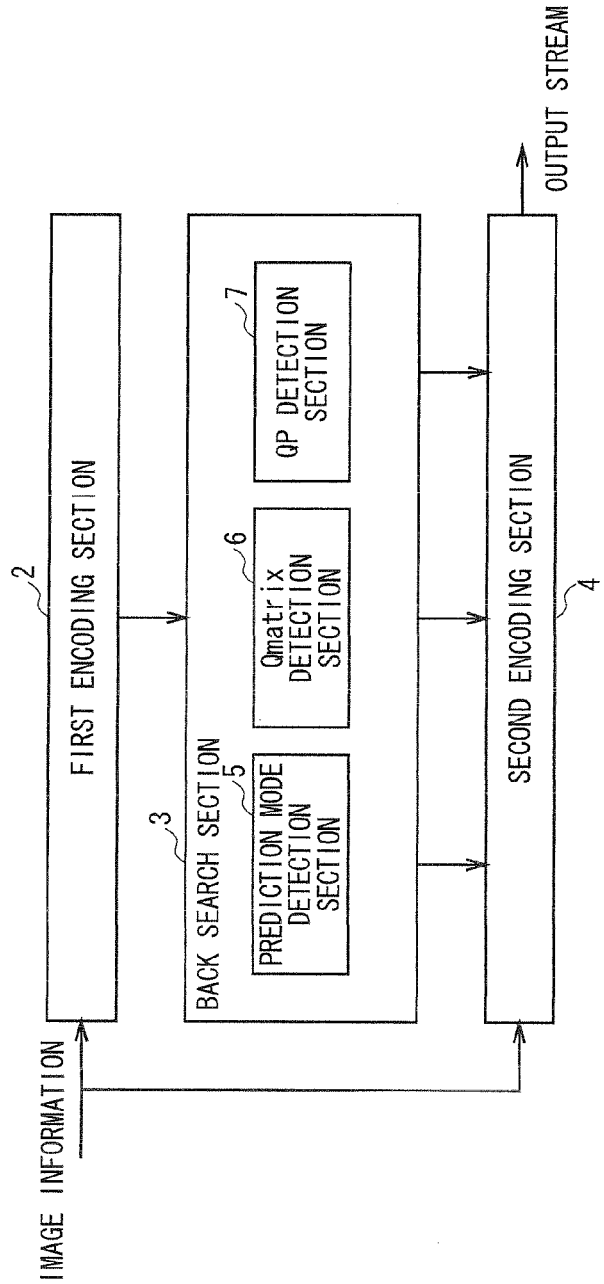
FIG. 1 is a conceptual diagram illustrating an encoding device according to first and second embodiments of the present invention.

The following provides the description of FIG. 1 which shows a conceptual diagram of an encoding device and method according to the first embodiment of the present invention.

As shown in the diagram, an image processing device 1 includes a first encoding section 2, a second encoding section 3 and a back search section 3. Moreover, the back search section 3 includes a prediction mode detection section 5, a quantization matrix (Qmatrix) detection section 6, and a quantization parameter (QP) detection section 7.

With the above configuration, the first encoding section 2 performs a first encoding process for the input image information. The back search section 3 evaluates the magnitude of a residue r obtained by dividing an integer DCT coefficient obtained during the first encoding process by a resealing factor (RF) that is a combination of various quantization matrixes Qmatrix and quantization parameters QP, in order to detect the quantization matrix Qmatrix, the quantization parameter QP and the intra image prediction mode that were used in the first encoding process. Then, the second encoding section 4 performs a second encoding process using the quantization matrix Qmatrix, the quantization parameter QP and the intra image prediction mode that were detected by the back search section 3 in the first encoding process.

That is, more specifically, the Qmatrix detection section 6 of the back search section 3, based on the integer DCT coefficient obtained during the first encoding process, uses the residue obtained by dividing, during the first encoding process, the above integer DCT coefficient by the resealing factor RF that is a combination of various quantization matrixes Qmatrix and quantization parameters QP, in order to detect the quantization matrix Qmatrix for each slice.

The QP detection section 7, based on the integer DCT coefficient obtained during the first encoding process, uses the residue obtained by dividing the integer DCT coefficient by the resealing factor RF that is a combination of various quantization matrixes Qmatrix and quantization parameters QP, in order to detect the quantization parameter QP for each macro block.

Moreover, the prediction mode detection section 5 detects an intra image prediction mode used in the previous encoding process. The detected prediction mode will be used by the second encoding section 4.

First, to get a better understanding of the image processing device 1 of the first embodiment of the present invention, the following provides the detailed description of the unique characteristics and principles the present embodiment has focused on.

As shown in FIG. 1, according to the AVC standard, for Intra images, one of the nine intra image prediction modes is selected to generate the difference image data from the input image. Incidentally, the AVC standard for Intra images is referred to as AVC Intra, hereinafter. Then, according to AVC Intra, a DCT process is carried out with the difference image data, and the obtained DCT coefficient is divided by the resealing factor RF that is a combination of the quantization matrix Qmatrix and the quantization parameter QP in order to perform quantization, thereby generating quantization data made of quantization levels (quantization coefficients). The quantization data are then encoded in a predetermined encoding format, becoming an encoding stream. For the encoding stream, the intra image prediction mode, the quantization matrix Qmatrix and the quantization parameter QP that were used in the encoding process are to be set.

According to the AVC standard, during the decoding process, the intra image prediction mode, the quantization matrix Qmatrix and the quantization parameter QP that were set are used to decode the quantization data, but the residual portion rounded off by the encoding process cannot be reproduced. Therefore, in the case of the AVC standard, the quality of video decreases according to the magnitude of the residual portion of the quantization. The decrease in the quality of video is referred to as quantization distortion, hereinafter.

For example, it is expected that such devices as a broadcasting device for business use repeat the encoding and decoding processes for video data multiple times. In this case, if a different intra image prediction mode, quantization matrix Qmatrix and quantization parameter QP are used each time, quantization distortion occurs in each encoding process, thereby reducing the quality of video data as the encoding process is repeated.

According to AVC Intra, when an image that has once undergone the encoding and decoding processes is encoded again, the quantization matrix Qmatrix, the quantization parameter QP and the intra image prediction mode that were used in the previous encoding process are used, since quantization distortion has been already cut off by the previous encoding process, quantization distortion is unlikely to occur anymore.

Therefore, according to the present invention, the quantization matrix Qmatrix, the quantization parameter or the intra image prediction mode that were used in the previous encoding process are detected, and the encoding process is carried out with them to reduce the deterioration of the quality of video data.

This method, which can almost certainly detect the quantization matrix Qmatrix, the quantization parameter QP or the intra image prediction mode that were used in the previous encoding process, is referred to as "back search," hereinafter.

Here, as disclosed in the above Patent Document 1, back search divides the DCT coefficient by each quantization scale Q in MPEG (Moving picture experts group)-2, and can detect the quantization scale Q whose residue r is the smallest as the quantization scale Q used in the previous encoding process.

However, there are the following differences between the AVC standard and MPEG-2. Accordingly, applying the MPEG-2 method without changing it reduces the accuracy of detection.

Thanks to the introduction of integer arithmetic, the DCT coefficients in the encoding process and those in the decoding process cannot be equally processed.

An arithmetic error during the decoding process is large, and this significantly affects the accuracy of detection.

Since a residual function has a cycle with respect to the quantization parameter QP, there is a plurality of the same minimum values.

Therefore, the aim of the present invention is that by employing the AVC encoding, the quantization matrix Qmatrix, the quantization parameter QP and the like that were used in the previous encoding process can almost certainly be detected on a predetermined unit basis, and the rounding error of quantization during dubbing are reduced with the use of them, thereby improving the quality of dubbing.

(1-2) Principle of Back Search

The following provides the detailed description of the above back search.

According to AVC Intra, during decoding, the quantization level Z is multiplied by the resealing factor RF that is a function of the quantization matrix Qmatrix and the quantization parameter QP, and the result of the decoding is the integer DCT coefficient Q whose figures have been shifted to the left by six bits:

$$(W<<6)=Z*RF \quad (1)$$

$$RFr=\{V Q\text{matrix } 2^{floor(QP/6)}\}>>4 \quad (2)$$

V: Multiplication factor defined by the AVC standard

In this manner, during decoding, the integer DCT coefficient W is obtained as a result of multiplying the quantization level Z by RF. Therefore, in the subsequent encoding process, the integer DCT coefficient W can be divided by RF. This means that if the shifted integer DCT coefficient (W<<6), during the subsequent encoding process, is divided by the same RF, the resultant residue r is considered to be zero. Given such characteristics, by evaluating the magnitude of the residue r obtained by dividing the shifted integer DCT coefficient (W<<6) by the resealing factor RF that is a combination of various quantization matrixes Qmatrix and quantization parameters QP, the quantization matrix Qmatrix and the quantization parameter QP that were used in the previous encoding process can be detected.

In addition to that, in order to improve the accuracy of detection, the image processing device 1 of the first embodiment takes into account the following points (i) to (vi) associated with the unique characteristics of AVC Intra, which MPEG does not take into account. The following provides the detailed description of each point.

(i) RF Transformation During Encoding and Decoding

According to AVC Intra, a DCT section is divided into an integral section and a non integral section: the integral section is referred to as an integer DCT, while the non integral section and quantization are collectively referred to as quantization. According to AVC Intra, a position where the integral section is separated from the non integral section in the encoding process is different from the one in the decoding process. So the integer DCT used in the encoding process (simply referred to as "DCT," hereinafter) and an integer inverse DCT used in the decoding process (simply referred to as "inverse DCT," hereinafter) are not inverse transformation. Accordingly, the DCT coefficient W used in the encoding process does not become equal to the inverse DCT coefficient W (referred to as "W'," hereinafter) used in the decoding process.

That is, the DCT coefficient and the DCT coefficient W' are represented as follows:

$$W = A \times A^T = \begin{pmatrix} 1 & 1 & 1 & 1 \\ 2 & 1 & -1 & -2 \\ 1 & -1 & -1 & 1 \\ 1 & -2 & 2 & -1 \end{pmatrix} \times \begin{pmatrix} 1 & 1 & 1 & 1 \\ 2 & 1 & -1 & -2 \\ 1 & -1 & -1 & 1 \\ 1 & -2 & 2 & -1 \end{pmatrix}^T \quad (3)$$

$$\times = CW'C^T = \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix} |W'| \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix}^T \quad (4)$$

According to these equations of DCT and the inverse DCT, there is the following equation between the DCT coefficient W and the DCT coefficient W':

$$W = \begin{pmatrix} 1 & 1 & 1 & 1 \\ 2 & 1 & -1 & -2 \\ 1 & -1 & -1 & 1 \\ 1 & -2 & 2 & -1 \end{pmatrix} \times \begin{pmatrix} 1 & 1 & 1 & 1 \\ 2 & 1 & -1 & -2 \\ 1 & -1 & -1 & 1 \\ 1 & -2 & 2 & -1 \end{pmatrix}^T \quad (5)$$

$$= \begin{pmatrix} 1 & 1 & 1 & 1 \\ 2 & 1 & -1 & -2 \\ 1 & -1 & -1 & 1 \\ 1 & -2 & 2 & -1 \end{pmatrix} \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix}$$

$$W' \begin{pmatrix} 1 & 1 & 1 & \frac{1}{2} \\ 1 & \frac{1}{2} & -1 & -1 \\ 1 & -\frac{1}{2} & -1 & 1 \\ 1 & -1 & 1 & -\frac{1}{2} \end{pmatrix}^T \begin{pmatrix} 1 & 1 & 1 & 1 \\ 2 & 1 & -1 & -2 \\ 1 & -1 & -1 & 1 \\ 1 & -2 & 2 & -1 \end{pmatrix}^T$$

$$= \begin{pmatrix} 4 & 0 & 0 & 0 \\ 0 & 5 & 0 & 0 \\ 0 & 0 & 4 & 0 \\ 0 & 0 & 0 & 5 \end{pmatrix} W' \begin{pmatrix} 4 & 0 & 0 & 0 \\ 0 & 5 & 0 & 0 \\ 0 & 0 & 4 & 0 \\ 0 & 0 & 0 & 5 \end{pmatrix}$$

$$= \begin{pmatrix} 16 & 20 & 16 & 20 \\ 20 & 25 & 20 & 25 \\ 16 & 20 & 16 & 20 \\ 20 & 25 & 20 & 25 \end{pmatrix} \otimes W'_{ij}$$

$$= D_{ij} \otimes W'_{ij}$$

In this manner, the result of multiplying 16, 20 and 25 by the position (i,j) of the DCT coefficient W' is W. This transformation matrix is referred to as "D", and defined in an equation (6). That is, RF used by the encoding of the back search process is the result of multiplying. RF used by the decoding (referred to as "RFr," hereinafter) by the DCT coefficient and the transformation matrix D of the DCT coefficient W'.

$$D = \begin{pmatrix} 16 & 20 & 16 & 20 \\ 20 & 25 & 20 & 25 \\ 16 & 20 & 16 & 20 \\ 20 & 25 & 20 & 25 \end{pmatrix} \quad (6)$$

Figure 2:
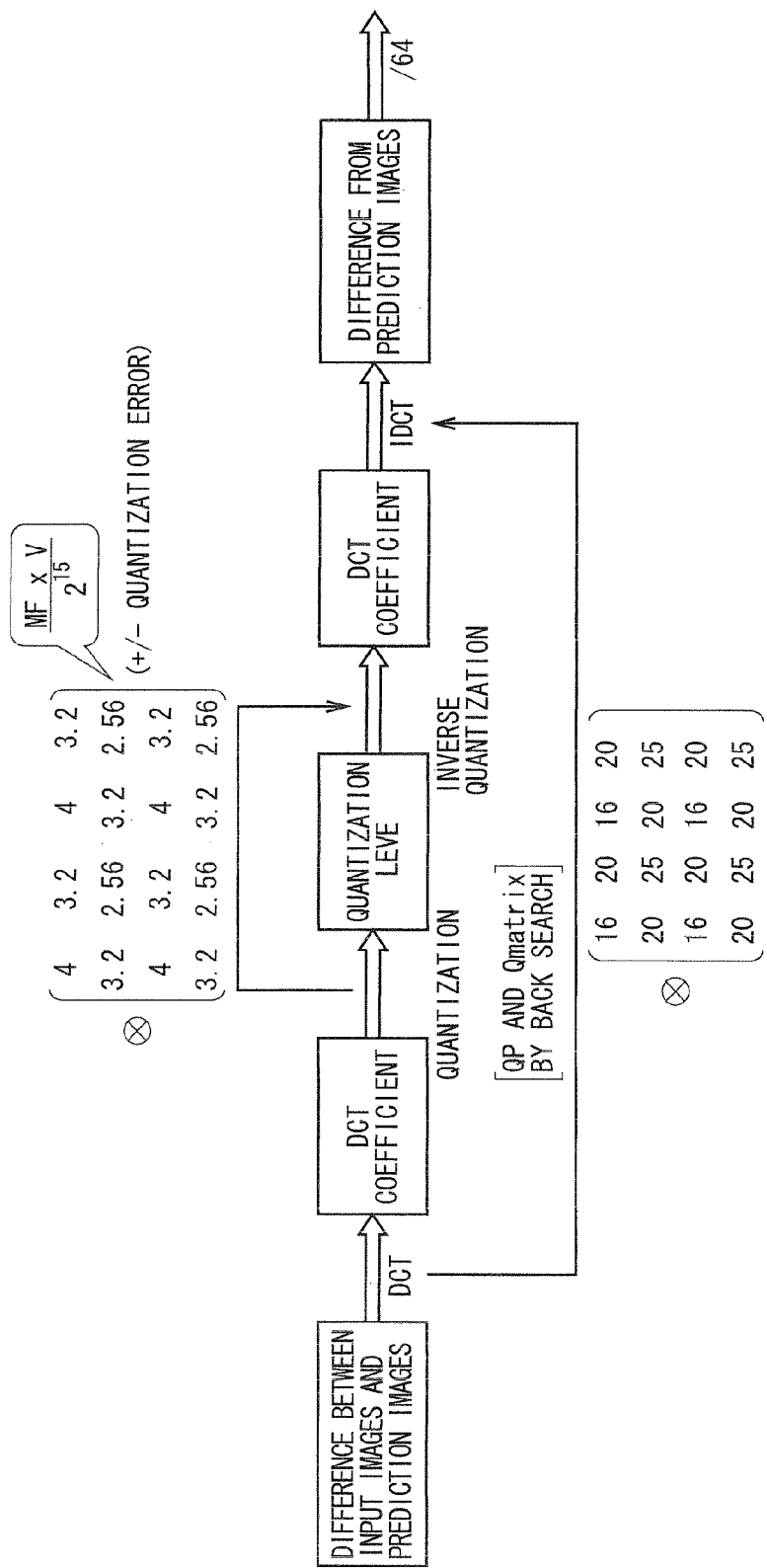
FIG. 2 is a schematic diagram illustrating transformation and quantization by the AVC standard.

That is, according to AVC Intra, as shown in FIG. 2, if the inverse DCT process is carried out for the difference image data after the DCT process with encoding and decoding, the value of the decoding difference image data is scaled up according to the transformation matrix D.

Moreover, according to AVC Intra, during quantization, a quantization error EF, represented by the following equation, occurs. Incidentally, using actual numbers for the equation (7) offers an equation (8). That is, according to AVC Intra, as the quantization process and the inverse quantization process are carried out by encoding and decoding the DCT coefficient, the value of an element of the inverse DCT coefficient is scaled up according to the quantization error ER.

$$ER = MF \times V/2^{15} \quad (7)$$

$$ER = \begin{pmatrix} 4 & 3.2 & 4 & 3.2 \\ 3.2 & 2.56 & 3.2 & 2.56 \\ 4 & 3.2 & 4 & 3.2 \\ 3.2 & 2.56 & 3.2 & 2.56 \end{pmatrix} \quad (8)$$

Therefore, according to AVC Intra, during decoding, the decoding difference image data is divided by 64 so that the value of the decoding difference data is at the same level as that of the difference image data.

That is, according to AVC Intra, at the time when the DCT process is carried out for the difference image data, it can be assumed that the transformation matrix D has been multiplied and scaled up. This means that the value of the residue r has been also scaled up accordingly, but as indicated by the equation (8), that value (i.e. a coefficient element) varies depending on the position of the matrix.

Therefore, if the DCT coefficient is divided by a decoding resealing factor RF, the residue r may either increase or decrease depending on the position of the DCT coefficient. As a result, a simple comparison of the residue r is impossible.

Accordingly, as indicated by the following equation, the image processing device 1 multiplies the resealing factor used in the decoding process (referred to as a decoding resealing factor RFr) by the transformation matrix D to generate the rescaling factor RF that will be used for division of the back search process:

$$RF = RFr * D \quad (9)$$

$$= \{VQmatrix\ D2^{floor(QP/6)}\} \gg 4$$

Therefore, given the DCT coefficient W of the equation (5) and the transformation matrix D of the DCT coefficient W', the DCT coefficient W of the input image (the difference image data) that has once undergone the encoding process can be divided by $\{VQmatrixD2^{floor(QP/6)}\}$ and the residue r is considered to become zero.

Therefore, the image processing device 1 can eliminate the effect of the scaling up of the DCT process from the residue r, making it possible to compare the residue r on the same scale.

In that manner, the image processing device 1 calculates the resealing factor RF by multiplying the decoding resealing factor RFr by the value of the transformation matrix D. Accordingly, by dividing the difference image data by the rescaling factor RF, the image processing device 1 can also perform a division process of amounts uniformly scaled up by the DCT process at the same time. This reduces the change of the residue r caused by the scaling up, thereby improving the accuracy of detection by the back search.

(ii) Error During Decoding

According to AVC Intra, the sum of absolute difference (SAD, i.e. the difference image data) with respect to the prediction image from the surrounding pixels is encoded. During decoding, the quantization level Z is multiplied by the decoding resealing factor RFr, but, in order to prevent arithmetic rounding of the decoding process, the decoding resealing factor RFr has been carried by six bits in advance according to the standard (that is why the DCT coefficient W' that has been shifted by six bits to the left is obtained in the decoding process).

Accordingly, the quantization process and the inverse DCT process are carried out with the decoding resealing factor RFr that has been carried by six bits; after being added to the prediction image that has been carried by six bits, six bits are borrowed for the result of addition to obtain a baseband image. This 6-bit borrowing rounds off data in the low six bits, causing an arithmetic error E; the shifted DCT coefficient (W<<6) generated in the subsequent encoding process may not be divided by the resealing factor RF.

Therefore, according to the present invention, instead of the quantization parameter QP by which the residue r is made equal to zero, the quantization parameter QP by which the residue r is made to be a minimum value is detected.

Here, there is the possibility that the arithmetic error E of the decoding process becomes a negative value. So, the value of the actual residue r and a value obtained by subtracting the residue r from the resealing factor RF are compared, and the smaller one is determined as an evaluation value Y.

For example, assume that RF is 3600 while the DCT coefficient W is 7200.

If there is no arithmetic error E, the residue r is represented as follows:

$$r = W \% RF \quad (10)$$
$$= 7200 \% 3600$$
$$= 0$$

In reality, the arithmetic error E cannot be estimated, but if E is −2 and the residue r is simply determined as equal to the evaluation value Y, the following equation is obtained, making it difficult to be detected as a minimum value:

$$Y = r = (W+E)\% RF = 3598 \quad (11)$$

Here, as described above, if the value of the actual residue r and the value obtained by subtracting the residue r from the resealing factor RF are compared and the smaller one is determined as the evaluation value Y, the following equation is obtained, and the evaluation value Y turns out to be an absolute value of the arithmetic error E:

$$Y = \min[r, (RF-r)] \min[3598, 2] = 2 \quad (12)$$

Accordingly, the image processing device 1 of the present invention follows the equation (12) to calculate the evaluation value Y, while detecting the quantization parameter QP by which the evaluation value Y is made to be a minimum value. Therefore, using the appropriate evaluation value Y, the image processing device 1 appropriately detects the quantization parameter QP.

Figure 3:
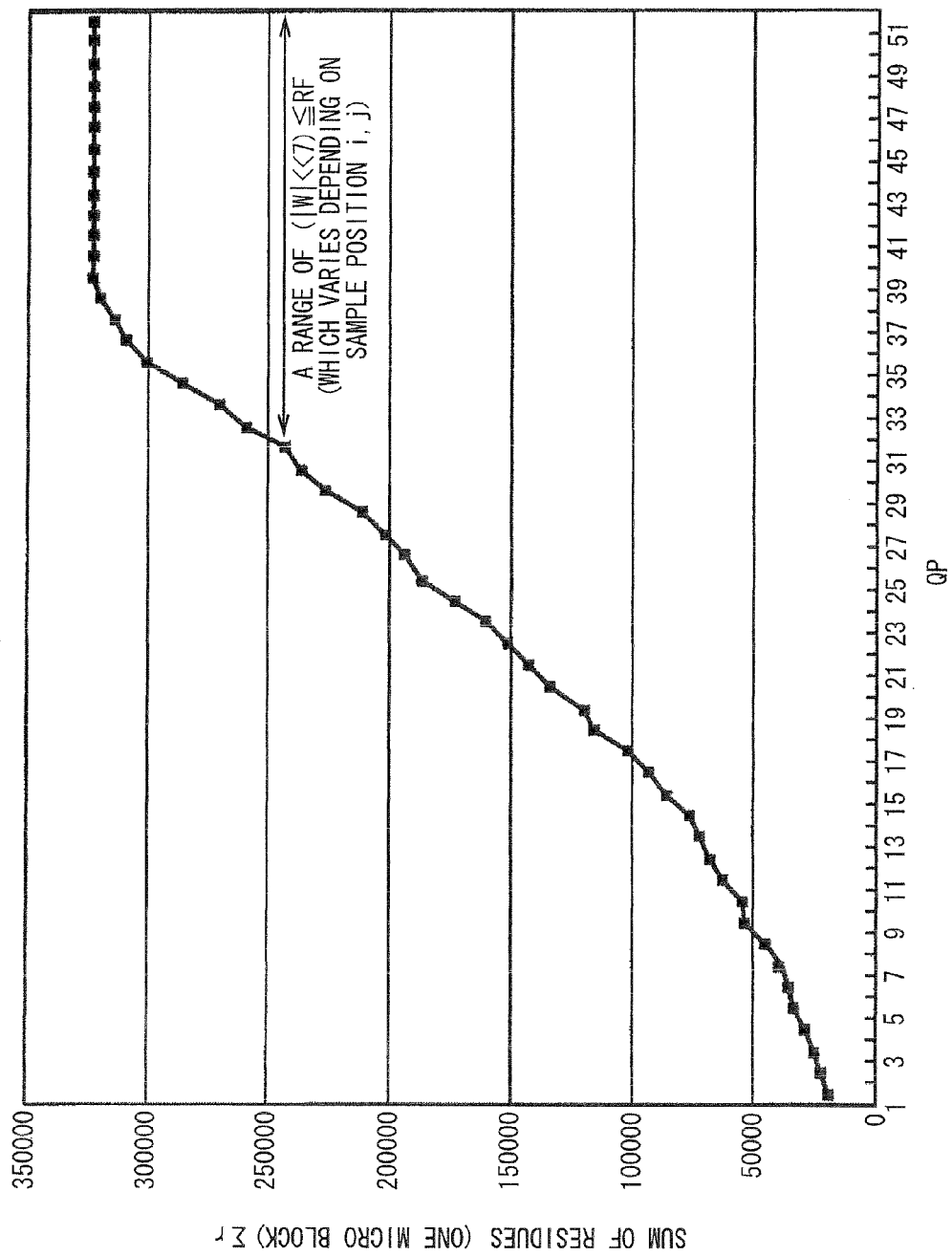
FIG. 3 is a diagram illustrating the correlation between a quantization parameter QP and the sum of residues (Σr) when an image that has not yet undergone any encoding process is input.

(iii) Characteristics of a Residual Curve and a Cycle of the Quantization Parameter QP FIG. 3 shows a curve sloping from right to left in the case in which: as for the input image that has not yet undergone the encoding process, the 6-bit shifted DCT coefficient (W<<6) is divided by the resealing factors RF of various quantization parameters QP to calculate the residues r; and the horizontal axis represents the quantization parameter QP, while the vertical axis represents the sum of residues (Σr).

Figure 4:
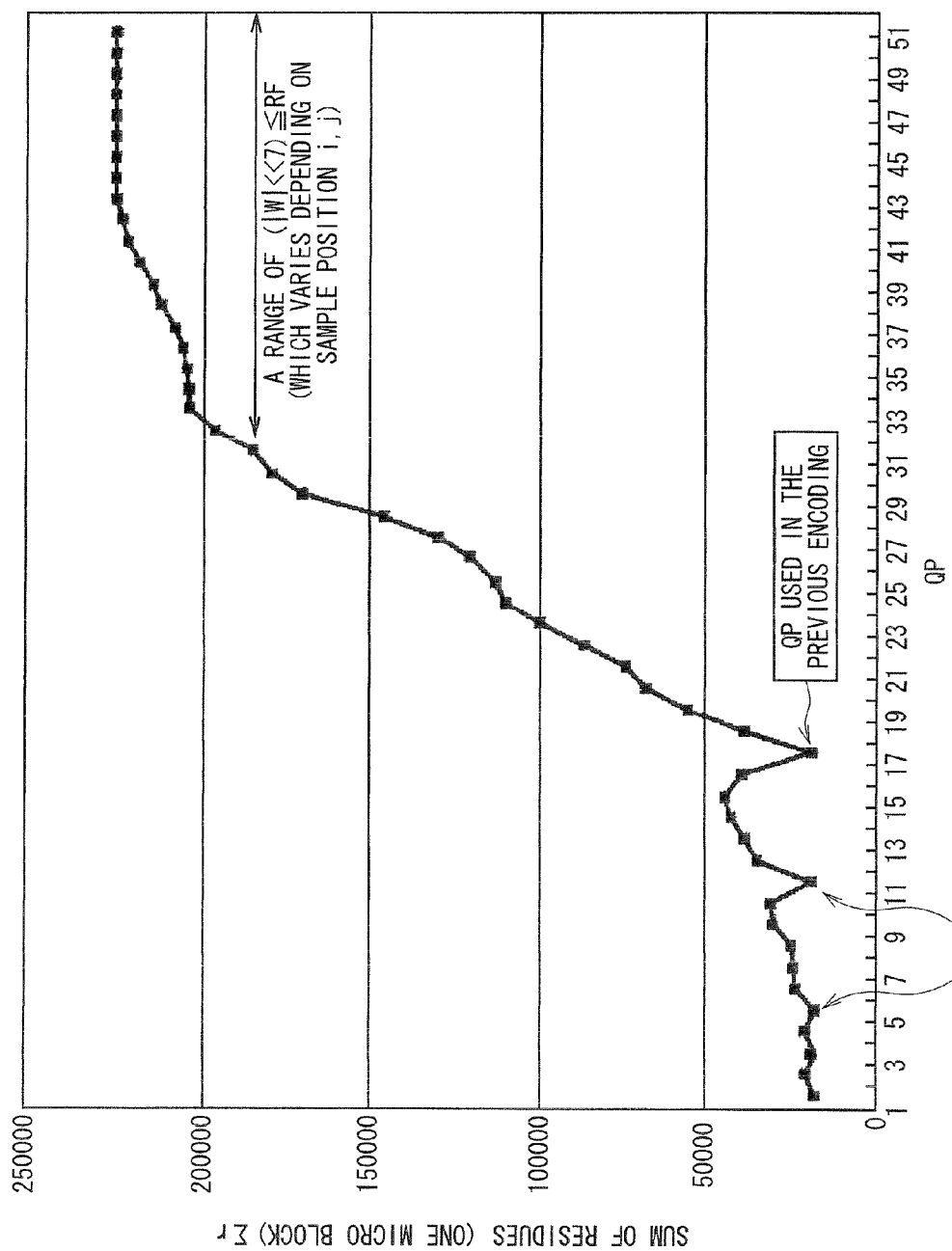
FIG. 4 is a diagram illustrating the correlation between a quantization parameter QP and the sum of residues (Σr) as for an input image that has undergone encoding and decoding processes.

Similarly, FIG. 4 shows the case in which: as for the input image that has already undergone the encoding and decoding process, the 6-bit shifted DCT coefficient (W<<6) is divided by the resealing factors RF of various quantization parameters QP to calculate the residues r; and the horizontal axis represents the quantization parameter, while the vertical axis represents the sum of residues (Σr). In this case, even though a minimum value of the sum of the residues r (Σr) is generated, the curve tends to slope from right to left; regardless of whether or not the encoding and decoding process have been already carried out, the sum of the residues r (Σr) becomes smaller as the quantization parameter QP gets smaller.

Accordingly, if the sums of the residues r (Σr) of various quantization parameter QP are simply compared in magnitude, the quantization parameter QP smaller than the quantization parameter QP used in the previous encoding process may be falsely detected as a minimum value. To solve this problem, the value of the residue r standardized by the rescaling factor RF is used as the evaluation value Y.

Figure 5:
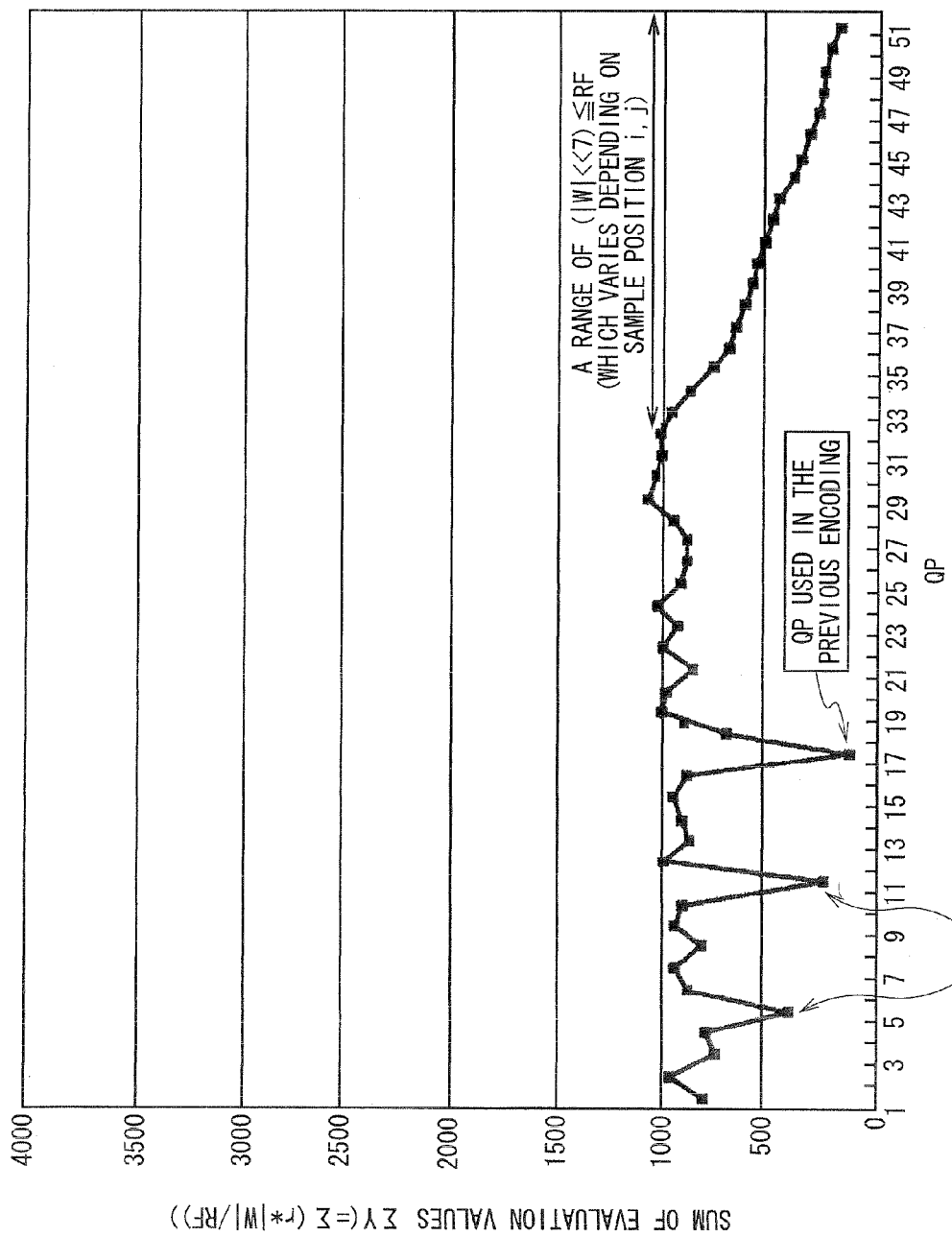
FIG. 5 is a diagram illustrating the correlation between a quantization parameter QP and the sum of evaluation values (ΣY) after standardization by a resealing factor RF.

FIG. 5 shows the correlation between the sum of evaluation values Y (ΣY) and the quantization parameter QP at this time. It is obvious from FIG. 5 that the sum of evaluation values Y (ΣY) of the quantization parameter QP used in the previous encoding process is smaller than the sum of evaluation values Y (ΣY) of the 6n-shifted quantization parameter QP.

Moreover, as shown in FIGS. 3 and 4, with the quantization parameter QP whereby (|W|<<7) becomes less than or equal to RF, the value of the evaluation value Y (an absolute value of the residue r) tends to have a range where it becomes flat. If the standardization by the resealing factor RF is carried out in this range, a monotonic reduction occurs (see FIG. 5), which is the cause of false detection.

In this case, if the division is carried out with the same resealing factor RF, the residue r statistically becomes larger as the DCT coefficient W increases. Therefore, scaling is carried out with the absolute value |W| of the DCT coefficient for the residue r, and then the standardization is carried out with the resealing factor RF. Accordingly, if the DCT coefficient W that is able to have a large residue has a small residue, this is considered not accidental. This allows weighting (since the DCT coefficients W become larger as the frequency components become lower, the lower frequency components are usually weighted).

Figure 6:
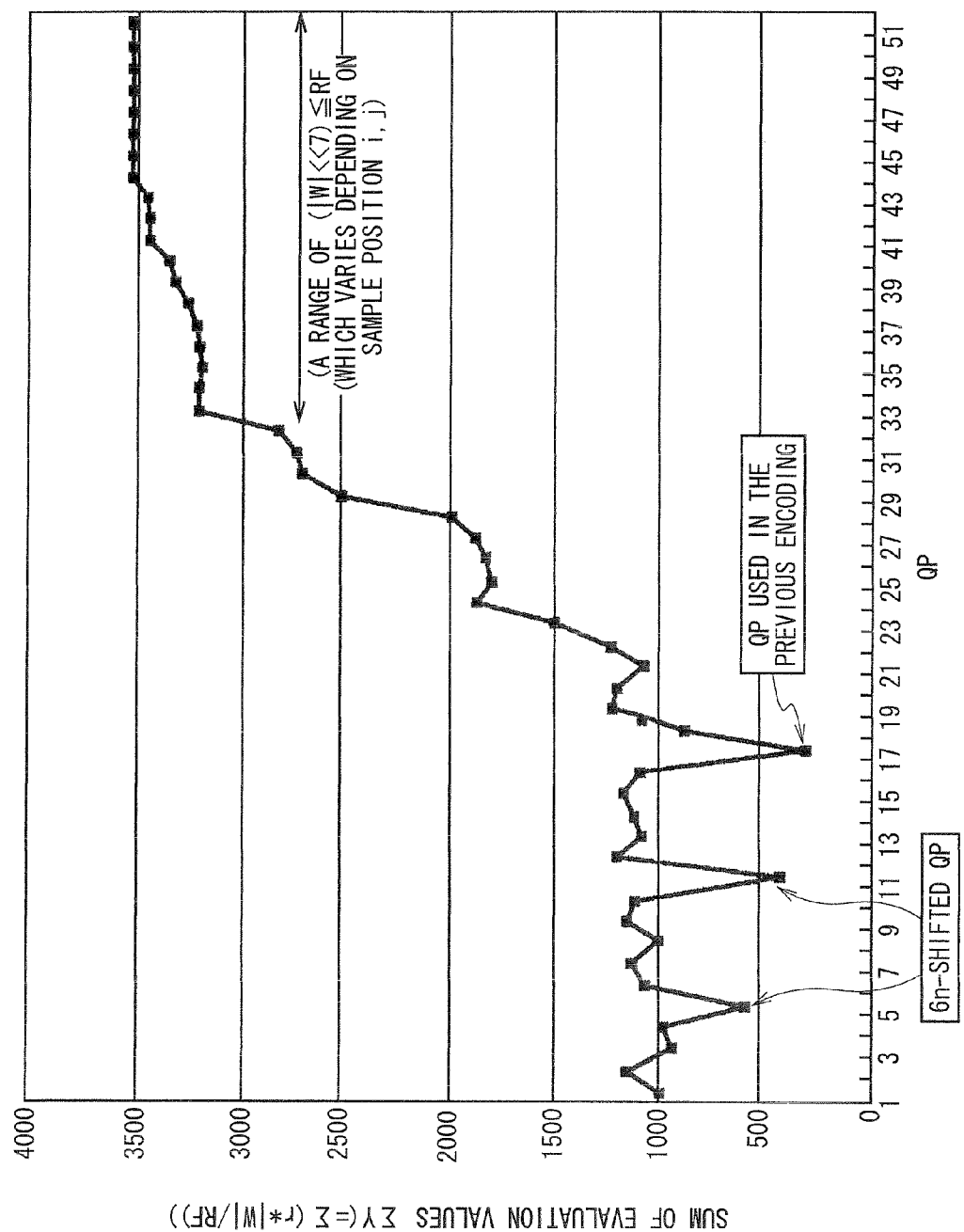
FIG. 6 is a diagram illustrating the correlation between a quantization parameter QP and the sum of evaluation values (ΣY) after standardization by a resealing factor RF and correction of a predetermined area.

FIG. 6 shows the correlation between the sum of evaluation values Y (ΣY) standardized by the resealing factor RF and the quantization parameter QP, after the scaling of the residue R by the absolute value |W| of the DCT coefficient. It is obvious from the diagram that compared with FIG. 5, the sum of evaluation values Y (ΣY) for the quantization parameter QP used in the previous encoding process and the sum of evaluation values Y (ΣY) for the 6n-shifted quantization parameter QP remain almost unchanged.

Moreover, the image processing device 1 carries out the standardization with the resealing factor RF only in the range where the sum of evaluation values Y slopes with (|W|<<7) >RF. In the other ranges, the value of the DCT coefficient absolute value |W| can be used as the evaluation value Y.

Accordingly, as shown in FIG. 6, the image processing device 1 can certainly prevent detecting the wrong quantization parameter QP as the quantization parameter QP used in the previous process. The wrong quantization parameter QP may be detected if the sum of evaluation values Y (ΣY) becomes the smallest within the range where (|W|<<7) is less than or equal to RF because of the standardization by the resealing factor RF.

(iv) Cycle of the Quantization Parameter QP

According to the specification of AVC Intra, the quantization parameter QP has a characteristic that the quantization parameter QP is changed by ±6, the resealing factor RF is multiplied by ±2. Accordingly, if the sum of residues r (Σr) has a minimum value with a certain quantization parameter QP, the sum of residues r (Σr) could have a minimum value even with QP±6n (n=1, 2, . . . ) (see FIG. 4).

Accordingly, when the above evaluation value Y is evaluated in a simple manner, the 6n-shifted quantization parameter QP may be detected. Therefore, if the quantization parameter QP that is 6n larger than the quantization parameter QP whereby the sum of residues r (Σr) becomes the smallest has a minimum value, the image processing device 1 adopts this quantization parameter QP.

Specifically, the image processing device 1 selects as much as five quantization parameters QP whose sums of residues r (Σr) are smaller than the rest and stores their values in a queue. The image processing device 1 then compares the quantization parameter QP having the smallest sum of residues r (Σr) with the quantization parameter QP having the second smallest sum of residues r (Σr), and if there is a difference of 6n between them, the image processing device 1 adopts the larger quantization parameter QP. Moreover, the image processing device 1 compares the adopted quantization parameter QP and the quantization parameter QP having the third smallest sum of residues r (Σr), and if there is a difference of 6n between them, the image processing device 1 again adopts the larger quantization parameter QP. In this manner, the adopted quantization parameter QP is replaced with the other.

In this manner, if there is a plurality of the minimum values of the sum of residues r (Σr) detected, the image processing device 1 gives priority to the quantization parameter QP having a large value and adopts it as the quantization parameter QP used in the previous encoding process. In this manner, the image processing device 1 can prevents wrongfully detecting the 6n-shifted quantization parameter QP as the quantization parameter QP used in the previous encoding process.

Furthermore, the image processing device 1 confirms whether each of the sums of residues r (Σr) detected has a cycle of 6n, and therefore prevents wrongfully detecting an accidental minimum value as the quantization parameter QP used in the previous encoding process.

(v) Reduction Method for the Amount of Calculation

The image processing device 1 of the present invention, as mentioned above regarding various quantization parameters QP, calculates the resealing factor RF, and detects the quantization parameter QP used in the previous encoding process by using the evaluation value Y calculated from the residue r. Accordingly, as the number of quantization parameters QP which may be possibly adopted increases, the amount of things that should be calculated or evaluated increases accordingly. To prevent this problem, if the value of the quantization parameter QP used in the previous encoding process can be roughly estimated, it is considered enough to evaluate only the quantization parameters QP around it, thereby reducing the amount of calculation.

Incidentally, this quantization parameter QP, for example, can be calculated during an original determination process that uses a quantization coefficient, which is described in a third embodiment. Moreover, this can be estimated from the activity of the input image data.

(vi) Also, the Following Points are Taken into Consideration.

Even if the intra image prediction mode is different from the one used in the previous encoding process, the rate of detection can be maintained by carrying out a 6n replacement described in the above (iv). Moreover, the same holds for a case in which the value of the quantization parameter QP has been roughly estimated. This focuses on the problem that occurs when the prediction mode is switched to a different switch mode from the one used in the previous encoding process. But even if the prediction mode is different from the one used in the previous encoding process, the present embodiment can deal with this.

Assume that there are already several patterns of quantization matrix Qmatrix (for example, they can be identified by ID numbers or the like).

That is, in the image processing device 1, the resealing factor RF changes as the quantization matrix Qmatrix changes. Therefore, in addition to the quantization parameter QP, the quantization matrix Qmatrix needs to be detected.

The image processing device 1, by changing a combination of the quantization matrix Qmatrix and the quantization parameter QP on a macro block basis, calculates the resealing factor RF for each quantization matrix Qmatrix and each quantization parameter QP. Incidentally, as mentioned above with reference to FIG. 4, the minimum value of the residue r has a cycle of 6n with respect to the quantization parameter QP. Even if there is a difference of 6n in quantization parameter QP, there is no problem as long as the quantization matrix Qmatrix is detected. Accordingly, if the value of the quantization parameter QP used in the previous encoding process has been roughly estimated, it is considered enough for the image processing device 1 to evaluate the six successive quantization parameters QP including the above QP.

Given the above facts, the image processing device 1 of the present invention, based on the above characteristic ideas, performs a quantization matrix detection process to detect the quantization matrix Qmatrix used in the previous process, and then performs a quantization parameter detection process that uses this quantization matrix Qmatrix to detect the quantization parameter QP.

(2) First Embodiment (2-1) Configuration of an Encoding Device

Figure 7:
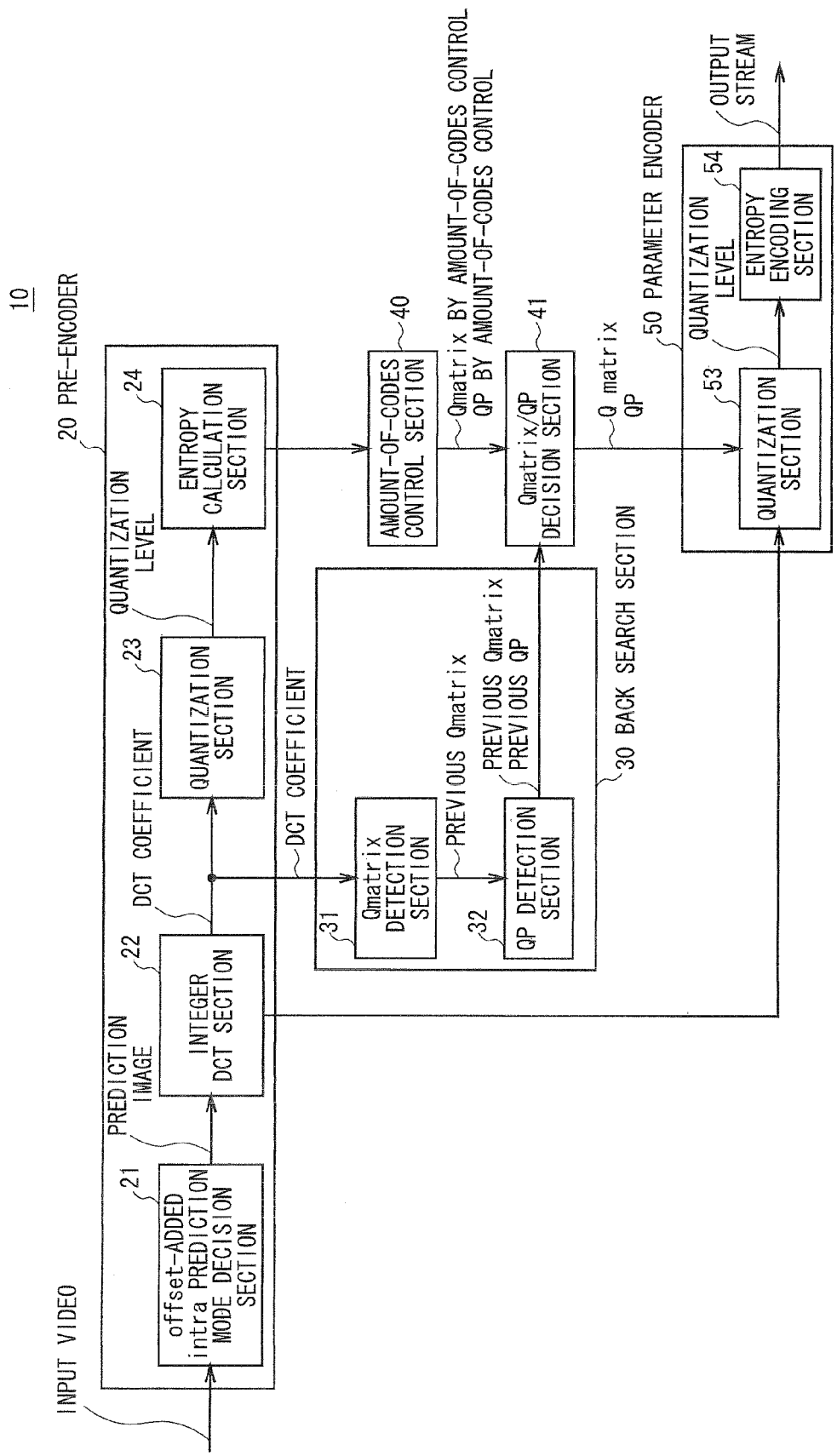
FIG. 7 is a diagram illustrating the configuration of an encoding device according to the first embodiment of the present invention.

The following describes the configuration of an encoding device 10 of the first embodiment of the present invention, with reference to FIG. 7. Incidentally, the encoding device 10 corresponds to the image processing device 1 in FIG. 1. Moreover, a back search section 30 corresponds to the back search section 3, a parameter encoder 50 corresponds to the second encoding section 4, a Qmatrix detection section 31 corresponds to the Qmatrix detection section 6, and a QP detection section 32 corresponds to the QP detection section 7.

As shown in FIG. 7, the encoding device 10 includes a pre-encoder 20 for a first pass, the back search section 30, a parameter encoder 50 for a second pass, an amount-of-codes control section 40, a Qmatrix/QP decision section 41, and an intra image prediction mode decision section 45. More specifically, the first-pass pre-encoder 20 includes an offset-attached Intra prediction mode decision section 21, an integer DCT section 22, a quantization section 23, and an entropy calculation section 24. The back search section 30 includes the Qmatrix detection section 31, the QP detection section 32 and an intra image prediction mode detection section 33. And the second-pass parameter encoder 50 includes an intra image prediction processing section 51, an integer DCT section 52, a quantization section 53, and an entropy encoding section 54. Incidentally, here, a two-pass encoding is expected to be employed. But, the basic concept does not change even if the other multi-pass encoding is used.

Figure 8:
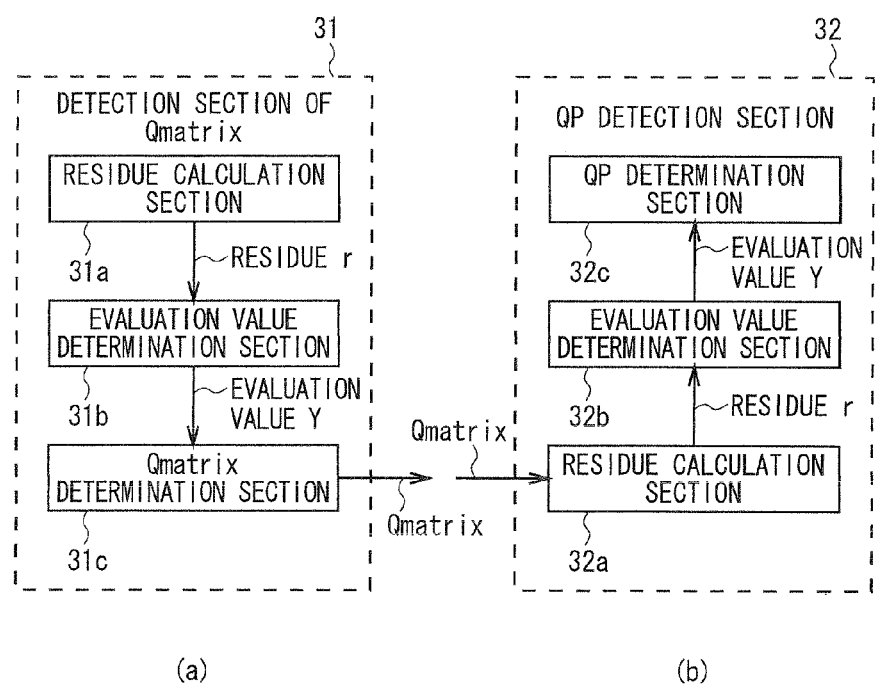
FIG. 8($a$) is a diagram illustrating the configuration of a Qmatrix detection section, and FIG. 8($b$) is a diagram illustrating the configuration of a QP detection section.

Here, FIG. 8(a) is a detail diagram illustrating one example of the configuration of the Qmatrix detection section 31. Moreover, FIG. 8(b) is a detail diagram illustrating one example of the configuration of the QP detection section 32.

As shown in FIG. 8(a), the Qmatrix detection section 31 includes a residue calculation section 31a, an evaluation value determination section 31b and a Qmatrix determination section 31c. And, as shown in FIG. 8(b), the QP detection section 32 includes a residue calculation section 32a, an evaluation value determination section 32b and a QP determination section 32c.

With the above configuration, the input image is input into the first-pass pre-encoder 20.

More specifically, the input image data are input into the offset-attached Intra prediction mode decision section 21. The offset-attached Intra prediction mode decision section 21 performs an offset preference application process, described below, to determine an appropriate intra image prediction mode from among nine intra image prediction modes, and also generates, as well as the sum of absolute difference SAD, the difference image data from a prediction image in which the input image uses the surrounding pixels. The offset-attached Intra prediction mode decision section 21 inputs them into the integer DCT section 22.

The integer DCT section 22 performs orthogonal transformation by discrete cosine transform to generate the DCT coefficient W from the difference image data, and supplies it to the quantization section 23 and the back search section 3.

After receiving the DCT coefficient W, the quantization section 23 quantizes the DCT coefficient to generate quantization data. The quantization level Z output from the quantization section 23 after that quantization is transmitted to the entropy calculation section 24.

The entropy calculation section 24 carries out binarization and arithmetic coding for the input quantization level Z to generate an encoding stream, and supplies it to the amount-of-codes control section 40. The amount-of-codes control section 40, based on the amount of generated codes of the encoding stream, estimates the quantization matrix Qmatrix and the quantization parameter QP for the case in which an amount-of-codes control process is carried out for the parameter encoder 50, and supplies them to the Qmatrix/QP decision section 41.

Meanwhile, the DCT coefficient that the integer DCT section 22 transmitted to the back search section 30 on a slice unit basis is input into the Qmatrix detection section 31. The Qmatrix detection section 31 uses the residue calculation section 31a to divide the DCT coefficient by the resealing factors RF of various quantization matrixes Qmatrix, and supplies the results to the evaluation value determination section 31b. The evaluation value determination section 31b follows the idea described in the above (iii) to transform the residue r into the evaluation value Y, and transmits it to the Qmatrix determination section 31c. The Qmatrix determination section 31c compares the evaluation values Y of various quantization matrixes Qmatrix, and outputs the quantization matrix Qmatrix whose evaluation value Y is the smallest as the quantization matrix Qmatrix used in the previous process. Incidentally, the detailed description of the procedure of the quantization matrix detection process by the Qmatrix detection section 31 will be described later.

This detected quantization matrix Qmatrix is transmitted to the QP detection section 32. The residue calculation section 32a divides the DCT coefficient W by the resealing factor RF of various quantization parameters QP, and supplies the results to the evaluation value determination section 32b. The evaluation value determination section 32b uses the quantization matrix Qmatrix detected by the evaluation value Qmatrix section 31 to transform, following the idea described in the above (iii), the residue r into the evaluation value Y, and transmits it to the QP determination section 32c. The QP determination section 32c compares the evaluation values Y of various quantization parameters QP, and outputs the quantization parameter QP whose evaluation value Y is the smallest as the quantization parameter QP used in the previous process. Incidentally, the detailed description of the procedure of the quantization parameter detection process by the QP detection section 32 will be provided later.

This detected previous quantization parameter QP and quantization matrix Qmatrix are transmitted to the Qmatrix/QP decision section 41. The Qmatrix/QP decision section 41, as for the quantization matrix Qmatrix and the quantization parameter QP, makes a determination as to whether to adopt what the first-pass pre-encoder 20 has estimated or what the back search section 30 has detected. Generally, if the input image data are an original image that has not yet undergone any encoding process, back search is likely to fail because the encoding process has not yet carried out; therefore, what the encoding process of the first-pass pre-encoder 20 has estimated is adopted. By contrast, if the input image is a non-original image that has already undergone the encoding process, what the back search section 30 has detected is adopted in order to prevent the repetition of quantization distortion.

The second-pass parameter encoder 50, as mentioned above, uses the quantization matrix Qmatrix determined by the Qmatrix decision section 41, the quantization parameter QP, and the intra image prediction mode determined by the offset-attached Intra prediction mode decision section 21 to encode the input image and output it as an encoding stream (Stream).

More specifically, the intra image prediction processing section 51 selects, as the appropriate intra image prediction mode, the intra image prediction mode determined by the offset-attached Intra prediction mode decision section 21, generates the difference image data from the input image by using the prediction image of the surrounding pixels, and input the difference image data into the integer DCT section 52. The integer DCT section 52, by orthogonal transformation of discrete cosine transform, outputs the difference image data as the DCT coefficient W. After receiving the DCT coefficient W, the quantization section 53 carries out quantization with the quantization matrix Qmatrix determined by the Qmatrix/QP decision section 41 and the quantization parameter QP, and supplies the quantization level Z to the entropy encoding section 54. The entropy encoding section 54 carries out binarization and arithmetic encoding for the input quantization level Z, and outputs it as an encoding stream.

(2-2) Offset Preference Application Process

For the intra (intra image encoding) frames of AVC, reusing the intra image prediction mode used in the previous encoding process of dubbing is an effective measure to reduce the deterioration of the quality of image.

In the quantization matrix detection process and the quantization parameter detection process, as mentioned above, according to AVC Intra, during decoding, the quantization level Z is multiplied by the resealing factor RF which is a function of the quantization matrix Qmatrix and the quantization parameter QP, and the result of decoding is the DCT coefficient that has been shifted by six bits to the left. If the intra image prediction mode changes, so does the distribution of the DCT coefficient, thereby lowering the probability of the residue r being zero.

Figure 9:
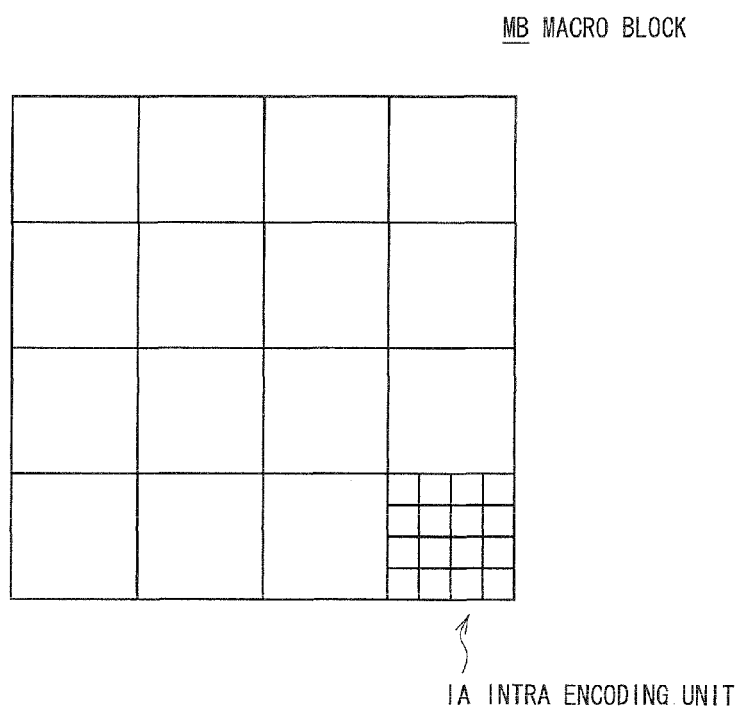
FIG. 9 is a diagram illustrating the correlation between a macro block and an intra encoding unit.

That is, as shown in FIG. 9, the above-mentioned quantization matrix detection process and quantization parameter detection process are carried out for each macro block MB, or a 16×16 pixel unit basis, whereas the image prediction is carried out on the bases of an intra encoding unit IA of 4×4-pixel sub-macro blocks, for example. That is, the macro block MB contains the intra encoding unit IA of 4×4=16.

The encoding device 10 detects in advance the intra image prediction mode having the smallest amount of codes, and performs the above-mentioned quantization matrix detection process and quantization parameter detection process with the detected intra image prediction mode. At this time, the detected intra image prediction mode is not necessarily the one used in the previous encoding process, but since the intra image prediction mode having the smallest amount of generated codes is used, many of the 16 intra encoding units IA are considered the intra image prediction modes encoded by the previous process.

In this case, the encoding device 10, as mentioned above, detects a minimum value by using the sum of residues r ($\Sigma r$) for each macro block. Accordingly, even if the 16 intra encoding units IA contain a different intra image prediction mode from the one used in the previous process, the image processing device 1 can appropriately detect the quantization matrix Qmatrix and the quantization parameter QP based on many of the previously-encoded intra image prediction modes.

In addition to the above configuration, the encoding device 10 of the present invention, when performing the encoding process according to AVC Intra, gives priority to a particular intra image prediction mode among nine intra image (Intra) prediction modes specified by the AVC standard and chooses it. This helps the encoding device 10 to prevent the change of the intra image prediction mode during dubbing. As a result, the repetition of quantization distortion is prevented, thereby improving the quality of dubbing.

That is, there is a characteristic that if the intra image prediction mode used in the previous encoding process is selected during dubbing, further quantization distortion is unlikely to occur because the data that should be rounded off have been already dropped by the previous quantization process. Given such characteristics, according to the present embodiment, a predetermined intra image prediction mode is to be selected among other modes, thereby improving the quality of dubbing.

Here, to achieve a better understanding of the present invention, with reference to FIG. 10, the overview of the nine intra image prediction modes for the encoding process of AVC Intra will be described.

FIGS. 10(a) to (i) show prediction directions of nine types of intra image prediction modes (Mode number: 0 to 8).

As for the prediction directions, from among the nine prediction directions (the intra image prediction modes of mode numbers 0 to 8), one prediction direction (or one intra image prediction mode) is selected for each 4×4-pixel block, and the encoding process is carried out with the selected prediction direction on a 4×4-pixel block unit basis. Particularly, according to the intra image prediction mode with the mode number 2, based on the average of the total of eight pixels (mean(A, B,C,D,I,J,K,L), for example) including four pixels on the left side (adjacent in the horizontal direction) of a 4×4 processing-target pixels which will be processed and four pixels on the upper side (adjacent in the vertical direction), all the 4×4 pixels of the processing-target pixels are predicted.

The intra image prediction mode with the mode number 2 is referred to as a DC (Direct Current) prediction mode, hereinafter. As for other intra image prediction modes (with the mode numbers 0 to 1, and 3 to 8), prediction is carried out according to the arrows in the diagram.

Figure 11:
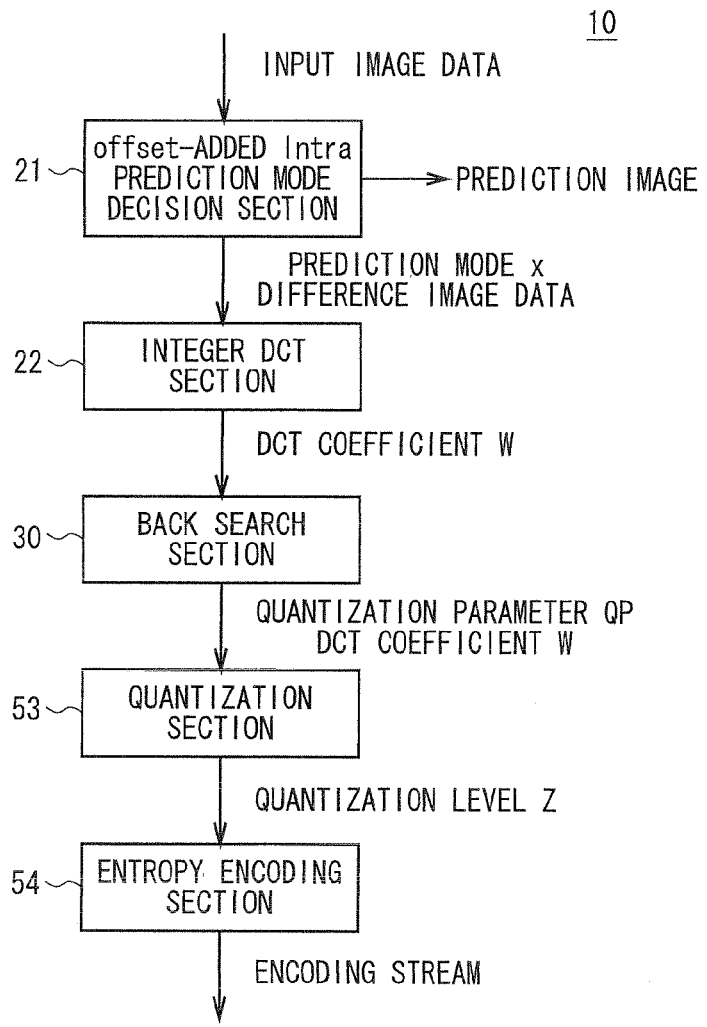
FIG. 11 is a block diagram illustrating the flow of a process according to the first embodiment of the present invention.

FIG. 11 illustrates the flow of a process that is performed when the input image data are a non-original image: FIG. 11 illustrates part of the configuration of the encoding device 10 of FIG. 7.

As shown in FIG. 11, the encoding device 10 performs a process by using the offset-attached Intra prediction mode decision section 21, which serves as intra image prediction mode decision means, the integer DCT section 22, which serves as discrete cosine transform means, the back search section 30, which serves as quantization parameter calculation means, the quantization section 53, which serves as quantization means, and the entropy encoding section 54, which serves as encoding means and may be CABAC (Context-based Adaptive Binary Arithmetic Code) or the like. Incidentally, the entropy encoding section 54 employs a binarization arithmetic encoding method in which encoding is adaptively carried out depending on the state (context) of the surrounding area.

With the above configuration, the input image data are input into the offset-attached Intra prediction mode decision section 21. The offset-attached Intra prediction mode decision section 21 adopts one of the nine intra image prediction modes. A conventional information encoding device adopts the one having the smallest sum of absolute difference SAD, which is the sum of absolute values of the processing-target pixels in the prediction image (i.e. the difference image data) of each intra encoding unit IA, in order to reduce the amount of generated codes in the entropy encoding section 54 by increasing the number of zeros in the quantization coefficients. According to the present embodiment, a process is carried out following the flow of a flowchart described later with reference to FIG. 14. That is, the offset-attached Intra prediction mode decision section 21 of the encoding device 10 sets in advance a value of offset for each intra image prediction mode, and calculates the sum of absolute difference SAD of the difference image data encoded by each intra image prediction mode. Then, the offset-attached Intra prediction mode decision section 21 adds to the sum of absolute difference SAD the offset value corresponding to the intra image prediction mode. At the same time, the offset-attached Intra prediction mode decision section 21 compares the offset-added sums of absolute value SADf to which the offset values have been added, and adopts the intra image prediction mode whose sum of absolute value SAD is the smallest as the intra image prediction mode to be used in an actual encoding process. The offset-attached Intra prediction mode decision section 21 supplies the mode number x of the selected intra image prediction mode and the difference image data to the integer DCT section 22.

The integer DCT section 22 performs orthogonal coordinate transformation for the difference image data by DCT, and supplies them to the back search section 30 as the DCT coefficients W. The back search section 30 performs the above-mentioned back search process to detect the quantization parameter QP and the quantization matrix Qmatrix, and supplies, along with the DCT coefficients W, them to the quantization section 53. The quantization section 53 quantizes the DCT coefficients W by using the quantization parameter QP and the quantization matrix Qmatrix, and outputs the result to the entropy encoding section 54 as the quantization level Z.

Accordingly, the entropy encoding section 54 carries out binarization and arithmetic encoding for the quantization level Z, and outputs the result as the encoding stream.

Here, especially, the offset-attached Intra prediction mode decision section 21 can offer the following characteristic points.

(1) Preventing quantization distortion from occurring again by setting in advance the DC prediction mode whose differences in sum of absolute difference SAD from other intra image prediction modes are small and whose sum of absolute difference SAD can become larger or smaller than the others due to quantization distortion during the encoding process when the encoding process is carried out.

(2) For example, if there is an excessively strong correlation in a certain direction, like interlace images, and the amount of generated codes increase as the sum of absolute difference SAD from the prediction image significantly increases with the set DC prediction mode, suppressing the increase in the amount of generated codes by selecting the intra image prediction mode of that direction in which the correlation is strong.

(3) Thanks to the characteristics of the input image, the thresholds of the above (1) and (2) are adjusted by the value of a parameter offset. Moreover, the parameter offset takes a different value for each intra image prediction mode, and a preference order might be given in a phased manner, like DC prediction→Vertical direction prediction→Horizontal direction prediction→ . . . direction prediction.

Thanks to the above (1) to (3), the encoding device of the present embodiment can achieve the flexible quality of image due to the characteristics of the input image and control the quality of dubbing.

Figure 10:
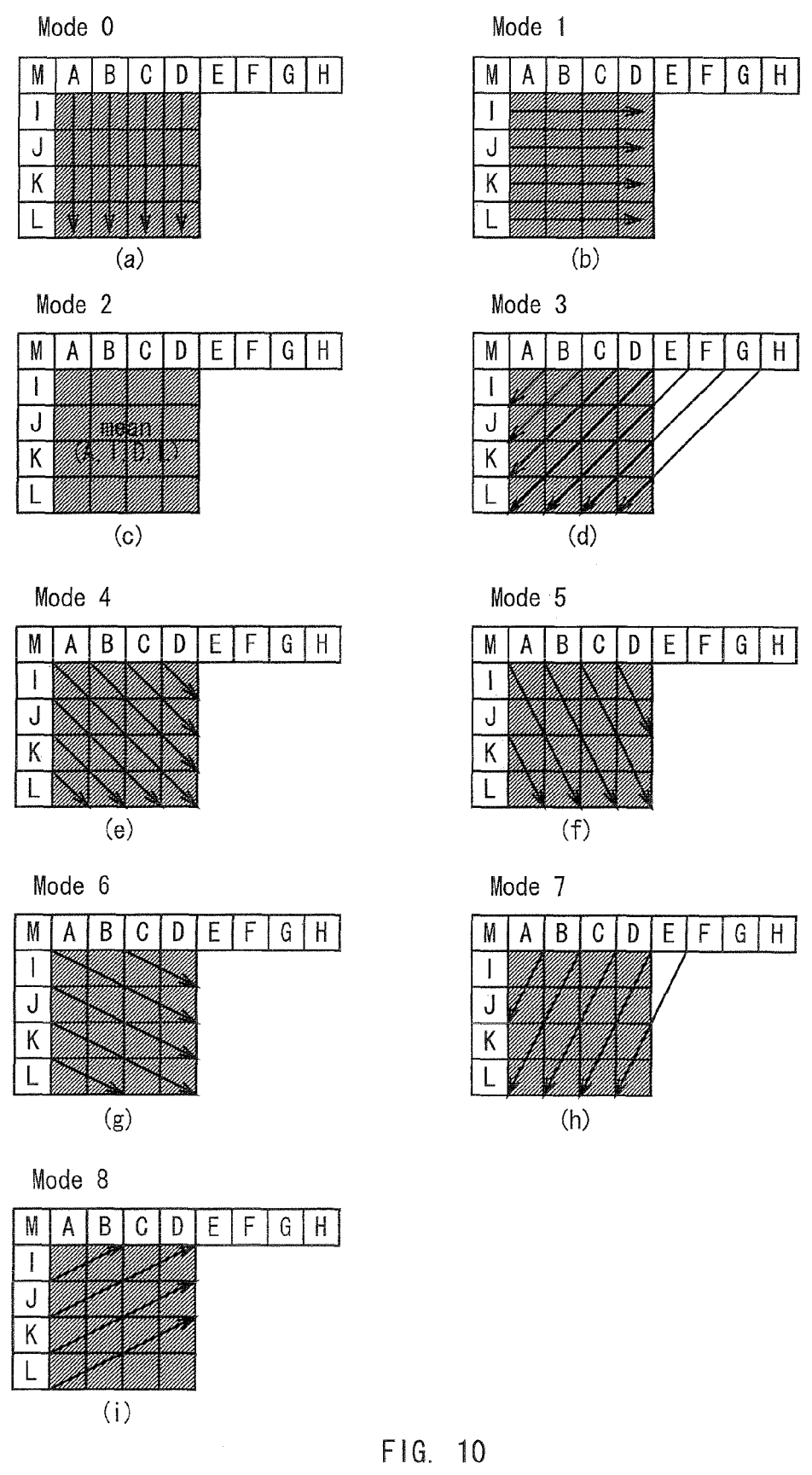

More specifically, according to AVC Intra, if only one intra image prediction mode is allowed, as mentioned above, from among the nine intra image prediction mode, the DC prediction mode (i.e. the intra image prediction mode number 2 in FIG. 10(*c*)) that obtains the prediction image from the average of the values of the surrounding pixels is excellent not only in terms of SNR value but also visual performance. Give these points, the encoding device 10 of the present embodiment gives priority to that DC prediction mode and chooses it. In reality, the encoding device 10 compares, among the nine intra image prediction modes, the intra image prediction mode having the smallest sum of absolute difference SAD, which should have been selected under normal circumstances, and the DC prediction mode in terms of the sum of absolute difference SAD from the prediction images, and if the difference is less than the offset, the encoding device 10 then selects the DC prediction mode.

Specifically, after the input image data are input, the offset-attached Intra prediction mode decision section 21 sets a value of offset[n] for each intra image prediction mode. The value of offset[n] is predetermined for each intra image prediction mode. The offset-attached Intra prediction mode decision section 21 reads out offset[n] from ROM (Read Only Memory: not shown) to set the value of offset[n].

The value of offset[n] is determined depending on how much the quality of video decreases due to encoding: the value is set smaller for the intra image prediction mode in which decline in the quality of video is smaller. That is, as for the value of offset[n], zero is set as an offset for the DC prediction mode (the offset is not added) in which decline in the quality of video is the smallest. Moreover, as for the value of offset[n], the value is set large for the intra image prediction mode in which degree of decline in the quality of video is large, while the value is set small for the intra image prediction mode in which degree of decline in the quality of video is small.

Then, the offset-attached Intra prediction mode decision section 21 generates the difference image data from the input image data for each intra image prediction mode, and calculates the sum of absolute difference SAD. The offset-attached Intra prediction mode decision section 21 adds offset[n] corresponding to the intra image prediction mode to the sum of absolute difference SAD, and calculates the offset-added sum of absolute difference SADf. Incidentally, as for the DC prediction mode, the sum of absolute difference SAD is equal to the offset-added sum of absolute difference SADf.

The offset-attached Intra prediction mode decision section 21 compares the offset-attached sums of absolute difference SADf, and selects the intra image prediction mode having the smallest offset-attached sum of absolute difference SADf as the intra image prediction mode to be used in the encoding process.

Then, the offset-attached Intra prediction mode decision section 21 supplies the mode number x of the selected intra image prediction mode and the difference image data to the integer DCT processing section 23.

Finally, the value of offset generally offers the following results.

(a) When the Value of Offset is Small

In this case, among other things, the intra image prediction mode having the smallest sum of absolute difference SAD may be selected. Accordingly, the quality of images obtained after the first encoding process is likely to improve, but since the power of holding the DC prediction mode is week, there is no dramatic improvement in the quality of images after dubbing.

(b) When the Value of Offset is Large

In this case, since the power of holding the DC prediction mode is strong, the deterioration in the quality of images by dubbing can be suppressed. But as a result, the intra image prediction mode having the smallest sum of absolute difference SAD is rarely selected, and the quality of images obtained after the first encoding process is likely to decrease. When the dubbing process is repeated, its SNR and visual performance improve, compared with when the intra image prediction mode having the smallest sum of absolute difference SAD is adopted.

Given the facts of those (a) and (b), if it is expected that the dubbing process is repeated multiple times for images in television broadcasting stations or the like, a large value (about 32 to 128) should be set as the offset. By contrast, if it is expected that the encoding process is carried out only one time for images or the dubbing process is rarely repeated for images, a small value (less than 32, for example) should be set as the offset, in order to obtain the best SNR characteristic and visual performance at the most suitable stage of using the encoded images (the number of dubbing processes).

As described above, according to one embodiment of the present invention, the encoding device 10 offers the following effects. That is, by giving priority to the DC prediction mode and choosing it depending on the value of offset, the encoding device 10 can suppress the change of the intra image prediction mode during dubbing. Moreover, thanks to the value of offset, the encoding device 10 can flexibly control the quality of dubbing depending on how the encoding device 10 will use the images. And the encoding device 10 allows the same intra image prediction mode as the one used in the previous encoding process of dubbing to be selected more easily than the others, thereby preventing the repetition of quantization distortion and suppressing the deterioration in the quality of video during dubbing.

(2-3) Process Procedure (2-3-1) Quantization Matrix Detection Process

Figure 12:
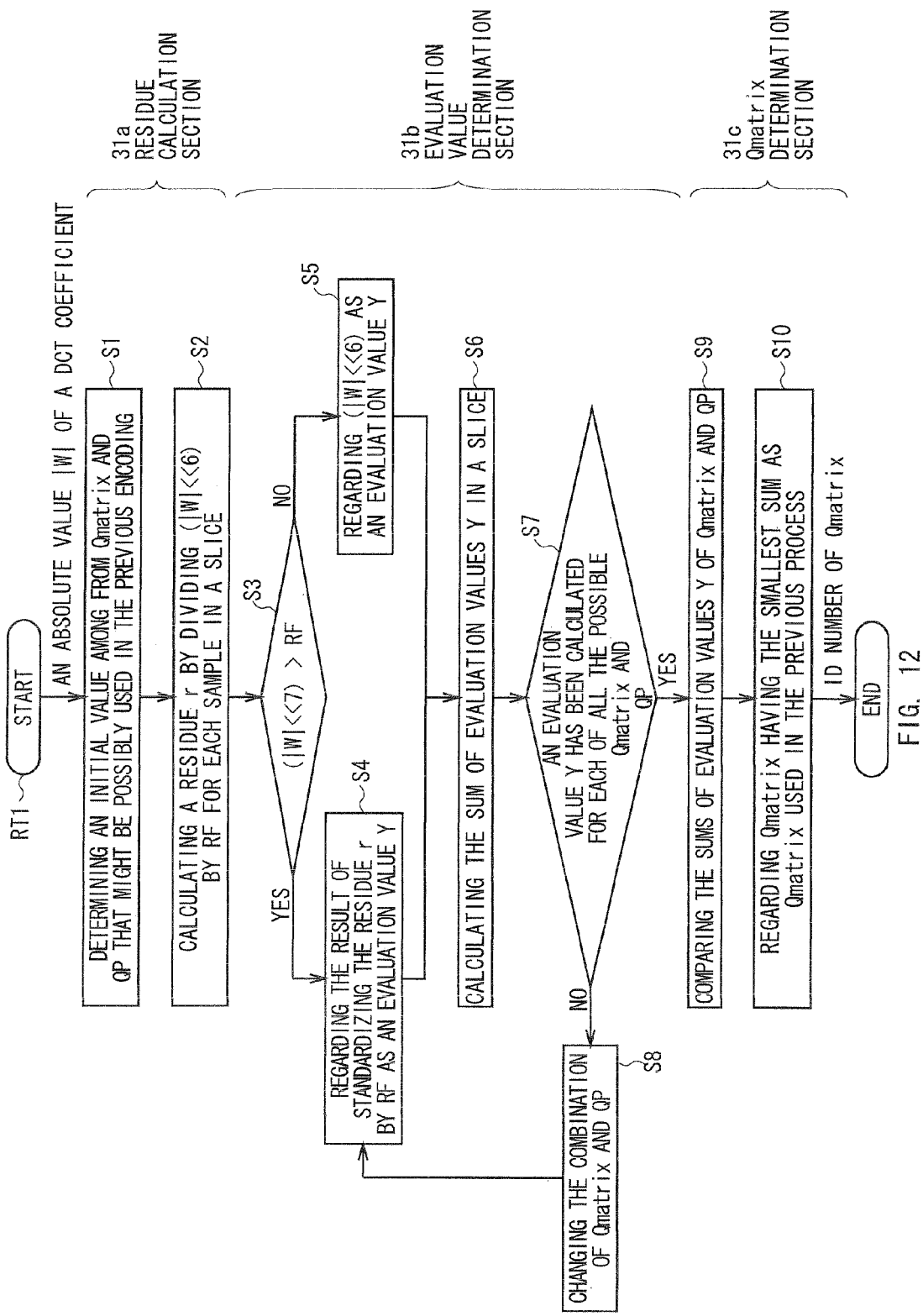
FIG. 12 is a flowchart illustrating a Qmatrix detection process on per slice unit basis by the Qmatrix detection section of the encoding device according to the first embodiment of the present invention.

The following describes the process of Qmatrix detection on a slice unit basis by the Qmatrix detection section 31 of the encoding device 10 according to the first embodiment of the present invention, with reference to a flowchart of FIG. 12, which illustrates the procedure RT1 of the quantization matrix detection process. This also corresponds to an image information encoding method of the present embodiment.

Incidentally, in the case of FIG. 12, only when the absolute value |W| of each DCT coefficient is less than or equal to a standardization threshold (i.e. when |W|<<7 is less than or equal to RF), the encoding device 10 standardizes the residue r by the resealing factor RF to calculate the evaluation value Y; when the absolute value |W| of each DCT coefficient is greater than the standardization threshold, the encoding device 10 determines the residue r as the evaluation value Y. Then, based on the resealing factor RF in which evaluation value Y becomes the smallest, the encoding device 10 detects the quantization matrix Qmatrix.

After the absolute value |W| of the DCT coefficient W calculated by the integer DCT section 22 is input, the Qmatrix detection section 31 determines an initial value from among the quantization matrixes Qmatrix that the previous encoding process might possibly use and the quantization parameters QP (step S1).

Subsequently, by changing the combination of the quantization matrix Qmatrix and the quantization parameter QP on a macro block unit basis, the Qmatrix detection section 31 calculates the resealing factor RF for each quantization matrix Qmatrix and each quantization parameter QP. At this time, the residue calculation section 31a calculates the residue r by dividing, for each sample inside a slice, |W|<<6 by that resealing factor RF (step S2). Incidentally, as mentioned above with reference to FIG. 4, the minimum value of the residue r has a cycle of 6n with respect to the quantization parameter QP. Even if there is a difference of 6n between the quantization parameters QP, there is no problem for the process of FIG. 10 as long as the quantization matrix Qmatrix is detected. So as long as the value of the quantization parameter QP used in the previous encoding process has been roughly estimated, it is considered enough to carry out evaluation with the six successive quantization parameters QP including that value of QP.

Subsequently, the evaluation value determination section 31b makes a determination as to whether |W|<<7 is greater than RF, and if this relationship is true, the residue r is standardized (scaling) by the resealing factor RF and the result is determined as the evaluation value Y (step S4). By contrast, if that relationship is not true, the evaluation value determination section 31b determines |W|<<6 as the evaluation value Y (step S5). In this manner, as for 256 (=16×16) samples in the macro block, the evaluation value determination section 31b determines the result of correction and standardization of the above (iii) to the residue r obtained by dividing the shifted DCT coefficient (W<<6) by the resealing factor RF as the evaluation value Y, and calculates the sum of evaluation values Y for each quantization matrix Qmatrix and quantization parameter QP (step S6 to 8).

In that manner, after the evaluation values Y are calculated for all the possible quantization matrixes Qmatrix and six quantization parameters QP (Yes at step S7), the Qmatrix determination section 31c compares the sums of evaluation values Y of each quantization matrix Qmatrix and each quantization parameter QP on a slice unit basis (step S9), detects the quantization matrix Qmatrix having the smallest sum (ΣY), determines it as the quantization matrix Qmatrix used in the previous process (step S10), and then outputs ID number of this quantization matrix Qmatrix.

Incidentally, the encoding device 10 may multiply, before the process of step S2 for example, the residue r by the absolute value |W| of the DCT coefficient to obtain a weighted multiplication value, standardize the multiplication value by the resealing factor RF, and determine the result as the evaluation value Y. In this case, even if the absolute value |W| of each DCT coefficient is a large area, the encoding device 10 can prevent false detection by increasing the evaluation value Y of that area. Therefore, the values standardized by weighting can be uniformly determined as the evaluation values Y.

Moreover, if the encoding device 10 that determines the residue r as the evaluation value Y without changing it detects a minimum value and eventually detects a plurality of minimum values, the encoding device 10 is able to detect the large quantization parameter QP as the quantization parameter QP used in the previous encoding process after confirming that the cycle of the minimum values of the quantization parameter QP is 6n.

(2-3-2) Quantization Parameter Detection Process

Figure 13:
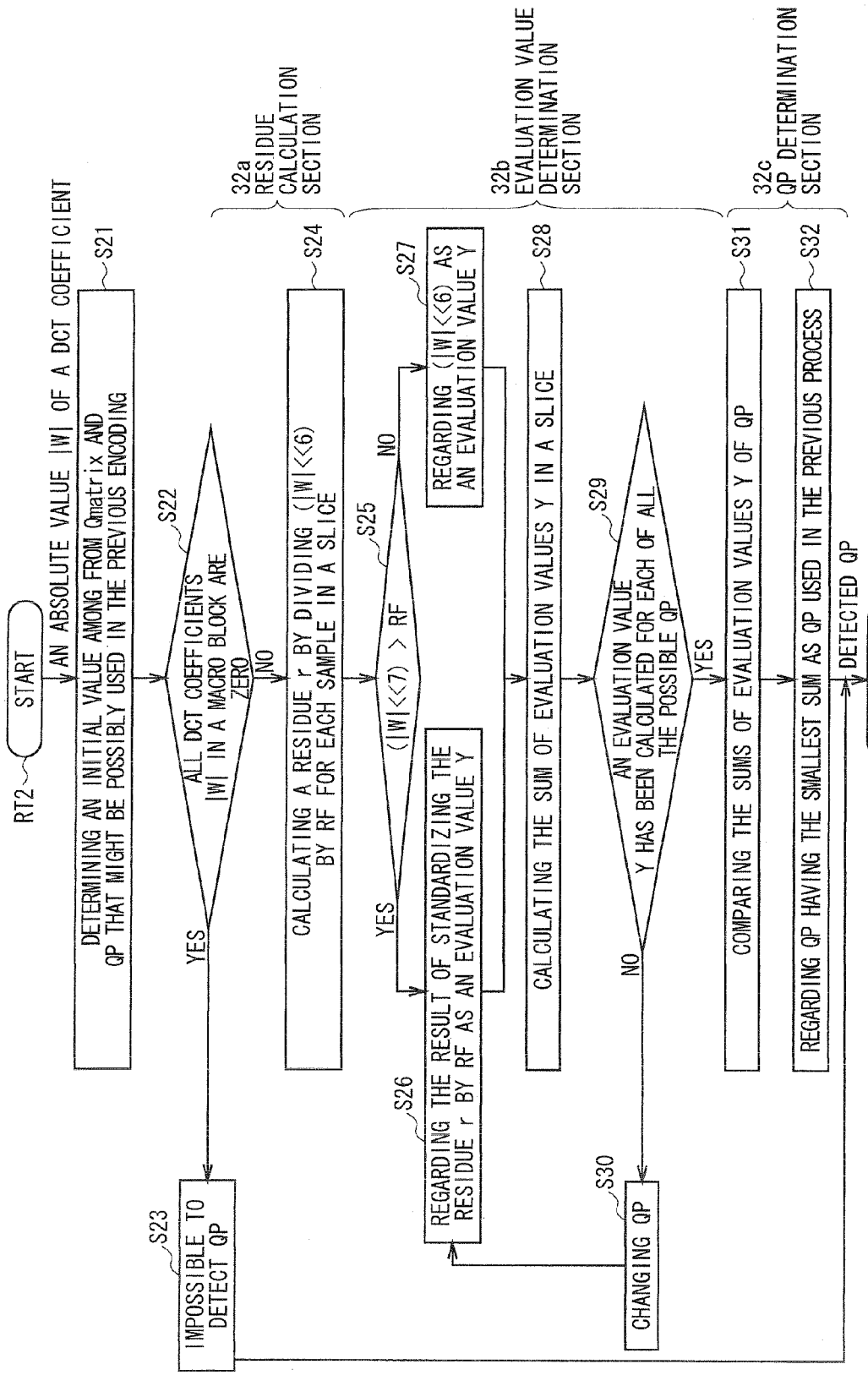
FIG. 13 is a flowchart illustrating a QP detection process on per macro block unit basis by the QP detection section of the encoding device according to the first embodiment of the present invention.

The following describes the process of quantization parameter QP detection on a macro block unit basis by the QP detection section 32 of the encoding device 10 according to the first embodiment of the present invention, with reference to a flowchart of FIG. 13, which illustrates the procedure RT2 of the quantization parameter detection process. This corresponds to an image information encoding method of the present embodiment.

Incidentally, in the case of FIG. 13, only when the absolute value |W| of each DCT coefficient is less than or equal to a standardization threshold (i.e. when |W|<<7 is less than or equal to RF), the encoding device 10 standardizes the residue r by the resealing factor RF to calculate the evaluation value Y; when the absolute value |W| of each DCT coefficient is greater than the standardization threshold, the encoding device 10 determines the residue r as the evaluation value Y. Then, based on the resealing factor RF in which evaluation value Y becomes the smallest, the encoding device 10 detects the quantization parameter QP.

After the absolute value |W| of the DCT coefficient W calculated by the integer DCT section 22 is input, the QP detection section 32 uses the detected quantization matrix Qmatrix to calculate the resealing factor RF for each quantization parameter QP on a macro block basis. If the value of the quantization parameter QP used in the previous process has been roughly estimated, the QP detection section 32 carries out the detection process only around that QP, thereby reducing the amount of calculation. After obtaining an initial value from the quantization parameters QP that the previous encoding process might possibly use (step S21), the QP detection section 32 makes a determination as to whether the absolute values |W| of all the DCT coefficients in the macro block are zero (step S22). Then, if the absolute values |W| of all the DCT coefficients are zero, the QP detection section 32 assumes that it cannot detect the quantization parameter QP (step S23). That is, if the absolute values |W| of all the DCT coefficients are zero, the QP detection section 32 cannot detect the quantization parameter QP because the residue r obtained by dividing it by any quantization parameter QP always becomes zero; the QP detection section 32 therefore quits detection.

By contrast, at step S22, if all the absolute values |W| of the DCT coefficients are not zero, the residue calculation section 32a of the QP detection section 32, for each sample of 256 (=16×16) in the macro block, calculates the residue r by dividing the shifted DCT coefficient (|W|<<6) by the resealing factor RF calculated by the equation (9) (step S24).

Subsequently, the evaluation value determination section 32b makes a determination as to whether (|W|<<7) is greater than RF (step S25), and if (|W|<<7) is greater than RF, the evaluation value determination section 32b determines the result of standardizing the residue r by the resealing factor RF as the evaluation value Y (step S26). If (|W|<<7) is not greater than RF, the evaluation value determination section 32b determines (|W|<<6) as the evaluation value Y (step S27). That is, the evaluation value determination section 32b, as for 256 (=16×16) samples in the macro block, determines the result of correction and standardization of the above-mentioned (iii) to the residue obtained by dividing the shifted DCT coefficient (W<<6) by RF as the evaluation value Y, and calculates the sum (ΣY) for each quantization parameter QP (step S28).

Then, the evaluation value determination section 32b makes a determination as to whether the evaluation values Y have been calculated for all possible quantization parameters QP (step S29), if the evaluation values Y have not been calculated for all possible quantization parameters QP, the evaluation value determination section 32b changes the quantization parameter QP (step S30), and repeats the processes of step S26, S28 and S29.

After the evaluation values Y have been calculated for all possible quantization parameters QP (Yes at step S29), the QP determination section 32c compares the sum of evaluation values Y (ΣY) of one QP with the others on a macro block unit basis (step S31), determines the quantization parameter QP having the smallest sum as the quantization parameter QP used in the previous process (step S32), and outputs the value of this quantization parameter QP.

At this time, an area where the quantization parameter QP is less than six is excluded because this can be the cause of false detection. This is because in a practical area of less than 200 Mbps, the quantization parameter QP whose value is less than 6 is rarely used. So excluding such quantization parameters QP helps improve the rate of detection.

As described above, according to the first embodiment of the present invention, the encoding device 10, by using the Qmatrix detection section 31, can almost certainly detect, from the DCT coefficients obtained during the encoding process, Qmatrix used in the previous encoding process by using the residue r on per slice basis. Moreover, the encoding device 10, by using the QP detection section 32, can almost certainly detect, from the DCT coefficients obtained during the encoding process, QP used in the previous encoding process by using the residue r on per macro block basis. Then, by reusing the detected quantization matrix Qmatrix and quantization parameter QP, the encoding device 10 reduces the error of rounding during the dubbing process, thereby improving the quality of dubbing. Furthermore, by introducing the transformation matrix D, the encoding device 10 can equally deal with the DCT coefficients of the encoding process and the DCT coefficients of the decoding process. Furthermore, by weighting the residue r with the DCT coefficient W and standardizing it with the resealing factor RF, the encoding device 10 can improve the accuracy of detection.

Moreover, the encoding device 10 takes into consideration the periodicity of the quantization parameter QP introduced from AVC, which has a cycle of 6n, and if the quantization parameter QP that is 6n larger than the quantization parameter QP whose residue r is the smallest has a minimum value, the encoding device 10 determines this quantization parameter QP, even if it is not the smallest value, as the quantization parameter QP used in the previous encoding process. Then, if the value of the quantization parameter QP used in the previous encoding process has been roughly estimated, the encoding device 10 changes that value of the quantization parameter QP in the range of n and evaluates it, thereby reducing the amount of calculation.

(2-3-3) Procedure of the Offset Preference Application Process

Figure 14:
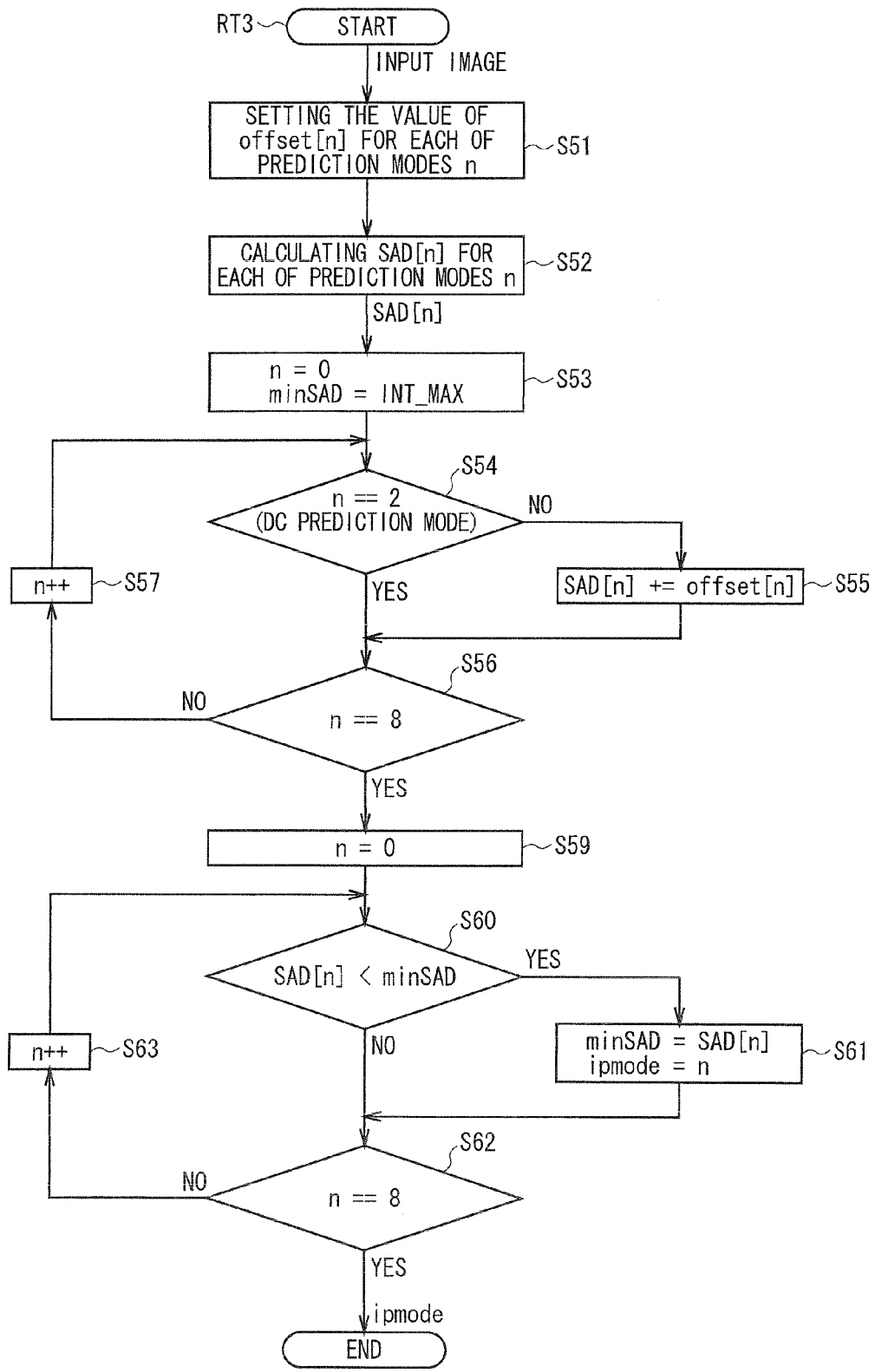
FIG. 14 is a flowchart detailing an offset preference application process according to the first embodiment of the present invention.

The following describes the procedure RT3 of the offset preference application process performed in accordance with an encoding program, with reference to a flowchart of FIG. 14.

After the input image data are supplied, the offset-attached Intra prediction mode decision section 21 of the encoding device 10 starts the procedure RT3 of the offset preference application process, and proceeds to step S51.

At step SP51, the offset-attached Intra prediction mode decision section 21 sets, for each image prediction mode, offset[n] depending on the mode number n, and then proceeds to the next step S52.

At step S52, the offset-attached Intra prediction mode decision section 21 generates the difference image data item corresponding to each mode number n of each image prediction mode, calculates the sums of absolute difference SAD from the difference image data items, and then proceeds to the next step S53.

At step S53, the offset-attached Intra prediction mode decision section 21 sets zero in the mode number n of the addition-process-target intra image prediction mode, sets a maximum value INT_MAX, which is considered a possible value in terms of calculation, as the minimum sum of absolute difference minSAD, and then proceeds to the next step SP54.

At step SP54, the offset-attached Intra prediction mode decision section 21 makes a determination as to whether the mode number n of the current addition-process-target is "2." If the negative result is obtained here, this means that offset should be added to the sum of absolute difference SAD. In this case, the offset-attached Intra prediction mode decision section 21 proceeds to the next step S55.

At step S55, the offset-attached Intra prediction mode decision section 21 adds to the sum of absolute difference SAD offset[n] set at step S51 to obtain the offset-added sum of absolute difference SADf, and then proceeds to the next step S56.

By contrast, if the affirmative result is obtained at step S54, this means that the sum of absolute difference SAD should be determined as the offset-added sum of absolute difference SADf without being changed. In this case, the offset-attached Intra prediction mode decision section 21 proceeds to the next step S56.

At step S56, the offset-attached Intra prediction mode decision section 21 makes a determination as to whether the current mode number n of the addition process target is "8." If the negative result is obtained here, this means that there is the intra image prediction mode still left to be processed. At this time, the offset-attached Intra prediction mode decision section 21 proceeds to the next step S57, adds "1" to the mode number of the addition process target, and then returns to step SP54 to continue the process.

By contrast, if the affirmative result is obtained at step S56, this means that all the offset-added sums of absolute difference SADf corresponding to all the intra image prediction modes (n=0 to 8) have been calculated. At this time, the offset-attached Intra prediction mode decision section 21 proceeds to the next step S59.

At step S59, the offset-attached Intra prediction mode decision section 21 sets "0" in the mode number n of the comparison process target, and then proceeds to the next step S59.

At step S59, the offset-attached Intra prediction mode decision section 21 makes a determination as to whether the offset-added sum of absolute difference SADf of the comparison process target is less than the minimum sum of absolute difference minSAD.

If the affirmative result is obtained here, the offset-attached Intra prediction mode decision section 21 proceeds to the next step S61, updates the minimum sum of absolute difference minSAD so that the minimum sum of absolute difference minSAD is the value of the offset-added sum of absolute difference SADf, and then proceeds to the next step S62.

By contrast, if the negative result is obtained at step S60, the offset-attached Intra prediction mode decision section 21 proceeds to the next step S62 because it does not have to update the minimum sum of absolute difference minSAD.

At step S62, the offset-attached Intra prediction mode decision section 21 makes a determination as to whether the mode number n of the comparison process target is "8." If the negative result is obtained here, this means that there is the intra image prediction mode still left to be processed. At this time, the offset-attached Intra prediction mode decision section 21 proceeds to the next step S63, adds "1" to the mode number n of the comparison process target, and then returns to step S60 to continue the process.

By contrast, if the affirmative result is obtained at step S62, this means that all the offset-added sums of absolute difference SADf corresponding to all the intra image prediction modes (n=0 to 8) have been compared. At this time, the offset-attached Intra prediction mode decision section 21 proceeds to an end step to end the procedure RT3 of the offset preference application process.

(2-4) Operation and Effect

With the configuration described above, the encoding device 10 generates, for each of the nine intra image prediction modes specified by the AVC standard, the difference image data item including a difference value from a pixel surrounding a process-target pixel. Then, the encoding device 10 ranks the intra image prediction modes depending on the sums of absolute difference SAD, which are the sums of differences based on the result of adding up the absolute values of each process-target pixel of the difference image data items, and the preference order by offset[n] preset for the intra image prediction modes.

Therefore, a specific intra image prediction mode whose value of offset[n] is small and whose priority is high is ranked high by the encoding device 10 among other things.

Moreover, the encoding device 10 adds to the sums of absolute difference SAD of a plurality of difference image data items the offset (offset[n]) depending on the intra image prediction mode to generate the offset-attached sums of absolute difference SADf. Then, the encoding device 10 compares the offset-added sums of absolute difference SADf to rank the intra image prediction modes.

Accordingly, the encoding device 10 can easily set the degree of preference for the order depending on the intra image prediction mode. Moreover, the encoding device 10 can suppress the increase in the amount of generated codes by adding offset[n], without sticking to a specific intra image prediction mode.

Furthermore, the intra image prediction mode at the time when the difference image data item whose offset-added sum of absolute difference SADf is the smallest was generated is determined by the encoding device 10 as the intra image prediction mode to be used to encode the difference image data item.

Therefore, the encoding device 10 allows a specific intra image prediction mode to be easily selected as the intra image prediction mode to be used to encode the difference image data item. Therefore, the intra image prediction mode used in the previous encoding process can be easily selected. As a result, the encoding device 10 can increase the probability of the same intra image prediction mode as the one used in the previous encoding process being used, thereby improving the quality of image during dubbing.

Moreover, the encoding device 10 does not add the offset to one intra image prediction mode in which decline in video quality is small, among a plurality of intra image prediction modes. Therefore, as the intra image prediction mode to be used to encode the difference image data, the intra image prediction mode in which decline in video quality is small can be easily selected. This can prevent the decline in video quality during decoding.

This intra image prediction mode in which decline in video quality is small is the DC prediction mode having a difference value from the average of the values of the surrounding pixels, or Mode 2 having a difference value from the average of the values of the surrounding pixels of the vertical and horizontal directions of the AVC standard. Therefore, by using the DC prediction mode in which decline in video quality is the smallest many times, the encoding device 10 can prevent the decline in video quality during encoding.

Furthermore, depending on how much the quality of image of the intra image prediction mode decreases, the encoding device 10 sets offset [n]. Therefore, the intra image prediction mode in which decline in video quality is small is ranked high in terms of the preference order.

Moreover, the encoding device 10 detects the quantization factor from the difference image data item of the intra image prediction mode: the quantization step used for the previous encoding process is based on the quantization factor. Therefore, the encoding device 10 can prevent the decline of video quality during dubbing.

Furthermore, the encoding device 10 sets, as offset[n], a value depending on the estimated number of times the dubbing process is performed. Therefore, offset[n] is set depending on usage and purposes, with the correlation between the amount of generated codes and the decline in video quality taken into consideration, in order to meet the users' demands.

According to the above configuration, as a result of comparing the sums of absolute difference SAD of the intra image prediction modes, the encoding device 10 ranks a specific intra image prediction mode higher than the rest. Therefore, the specific intra image prediction mode is ranked high every time. As a result, the encoding device 10 selectively ranks the intra image prediction mode used in the previous encoding process higher than the rest, allowing it to be easily selected as the intra image prediction mode to be used to encode the difference image data. Therefore, according to the present invention, the image processing device and the image processing method that are able to prevent the decline in video quality can be realized.

(3) Second Embodiment

Figure 15:
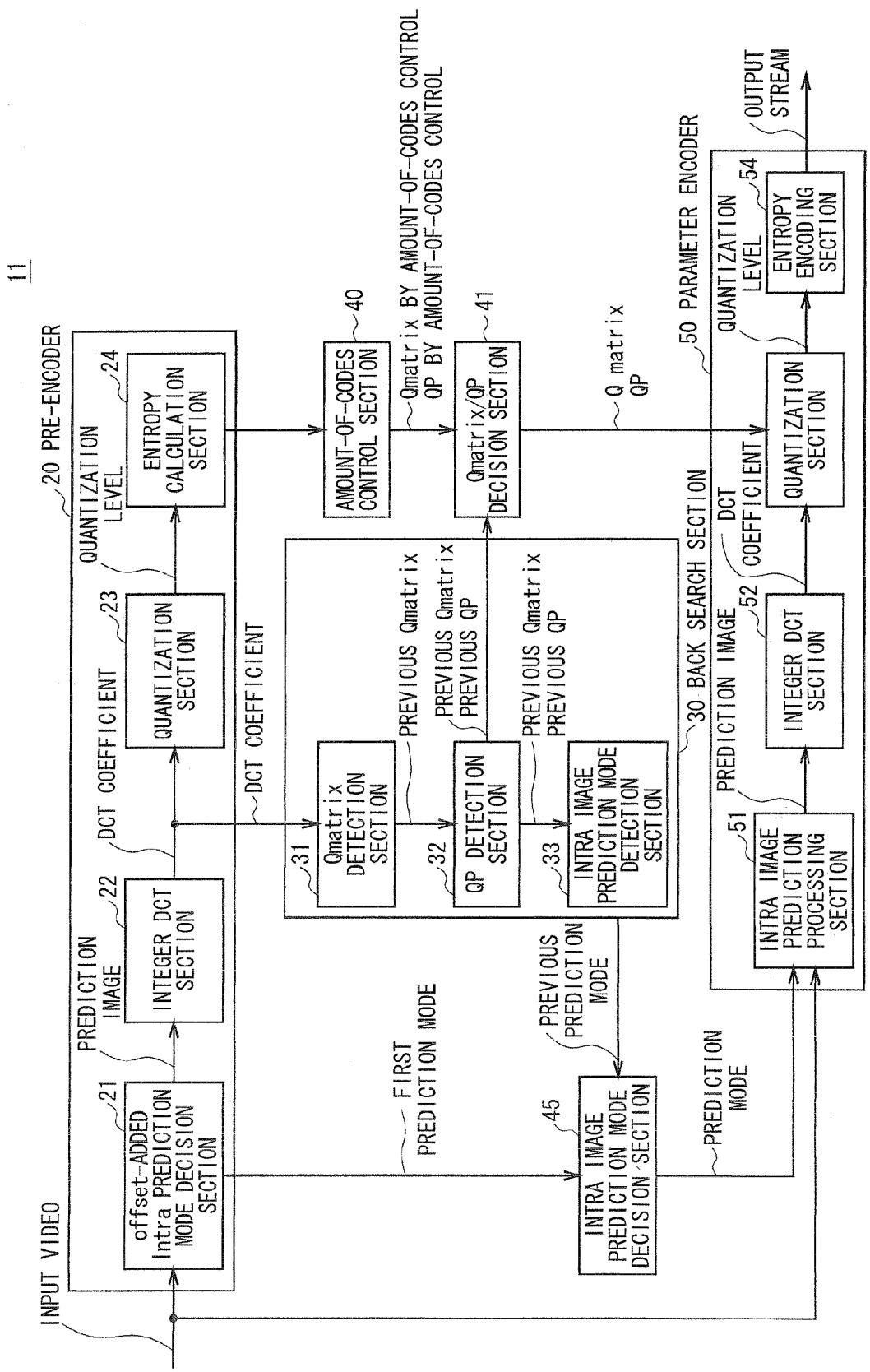
FIG. 15 is a diagram illustrating the configuration of an encoding device according to the second embodiment of the present invention.
Figure 16:
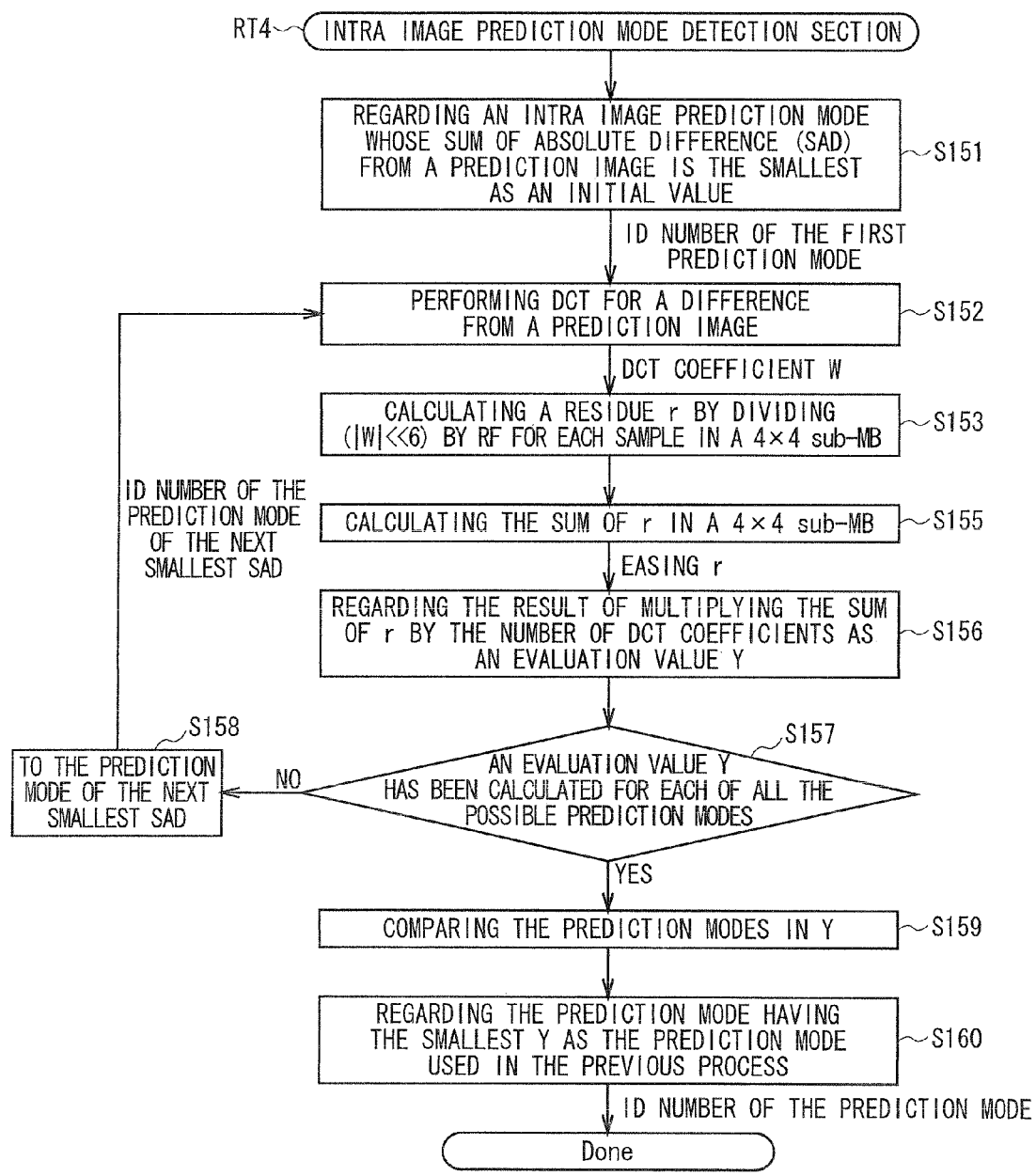
FIG. 16 is a flowchart illustrating a prediction mode detection process by the encoding device according to the second embodiment of the present invention.

In FIGS. 15 and 16, which illustrate a second embodiment of the present invention, the parts have been designated by the same symbols as the corresponding parts of FIGS. 2 to 14, which illustrate the first embodiment of the present invention. There is a difference between the encoding device 11 of the second embodiment and that of the first embodiment: an intra image prediction mode detection process is performed after the quantization matrix detection process and the quantization parameter detection process.

(3-1) Detection of the Intra Image Prediction Mode

In the case of the AVC intra (intra image encoding) frames, reusing the intra image prediction mode used in the previous encoding process of dubbing is an effective measure to prevent the decline in video quality. Accordingly, by using only the input image data, the intra image prediction mode detection process detects the intra image prediction mode used in the previous encoding process through an arithmetic process that uses the residue r, and this is one of the features.

That is, after detecting the quantization matrix Qmatrix and the quantization parameter QP, the encoding device 11 uses the quantization matrix Qmatrix and the quantization parameter QP and also uses the sum of residues r (Σr) while changing the intra image prediction mode for each intra encoding unit IA, in order to detect a minimum value. This enables the encoding device 11 to detect the intra image prediction mode encoded in the previous process, for each of all the intra encoding units IA in the macro block MB.

At this time, the encoding device 11 performs the offset preference application process to rank the offset-attached sums of absolute difference SAD, chooses three intra image prediction modes whose offset-attached sums of absolute difference SAD are smaller than the rest, and performs the intra image prediction mode detection process for them. This makes it easier for the encoding device 11 to select the intra image prediction mode encoded in the previous process. Therefore, that ensures that the three process-target intra image prediction modes include the intra image prediction mode encoded in the previous process.

That is, if the quantization matrix and the quantization parameter used in the previous encoding process have been already known based on the above-noted idea of the quantization matrix detection process and the quantization parameter detection process and the like, the intra image prediction mode detection process detects the intra image prediction mode having the smallest residue r by dividing the 6-bit-shifted DCT coefficients of the nine intra image prediction modes (W<<6) by the resealing factor RF.

In addition to that, in order to improve the accuracy of detection, the image processing device 1 takes into consideration the following points, which are attributable to the unique characteristics of AVC Intra and which MPEG does not take into account. That is, this intra image prediction mode detection process takes into consideration the following point (vii), as well as (i) and (ii) described above regarding the quantization matrix detection process and the quantization parameter detection process.

(vii) Distribution of the DCT Coefficients

As the intra image prediction mode changes, so does the value of difference. As a result, the distribution of the DCT coefficient changes too. So, in general, it is considered fair to divide the sum of residues r in the sub macro block by the number of the DCT coefficients, which is not zero, and compare the residues on per sample basis.

However, in reality, if the prediction mode used in the previous encoding process is selected, the prediction is highly likely to be true. Therefore, the number of the DCT coefficients that are not zero decreases. If the mode that is, in terms of direction, different from the previous prediction is selected, the number of the DCT coefficients that are not zero tends to increase.

Therefore, the intra image prediction mode detection process does not divide the sum of residues r by the number of the DCT coefficients that are not zero. Instead, the intra image prediction mode detection process multiplies the sum of residues r by the number of the DCT coefficients that are not zero. This is considered to impose a numerical penalty on the sum of residues r of the mode that is different from the previous prediction in terms of direction.

The result of multiplying the sum of residues r by the number of the DCT coefficients that are not zero is determined as the evaluation value Y. The evaluation value Y of one prediction mode is compared with the evaluation value Y of the other. Then, the prediction mode having the smallest evaluation value Y is considered the prediction mode used in the previous encoding process.

Given the above-mentioned characteristic idea (vii), the encoding device 11 of the present invention determines an appropriate prediction mode.

(3-2) Configuration of the Encoding Device

The encoding device 11 is different from the encoding device 10 in the following points: the encoding device 11 has an intra image prediction mode detection section 33, an intra image prediction mode decision section 45, an intra image prediction processing section 51 and an integer DCT section 52. The following mainly describes these sections that the encoding device 10 does not have.

The previous quantization parameter QP and quantization matrix Qmatrix detected by the Qmatrix detection section 31 and the QP detection section 32 are supplied to the Qmatrix/AP decision section 41. The Qmatrix/QP decision section 41 determines, as for the quantization parameter QP and the quantization matrix Qmatrix, whether to adopt what the first-pass pre-encoder 20 has estimated or what the back search section 30 has detected. Generally, if the input image data are an original image that has not yet undergone the encoding process, the back search process fails because the encoding process has never been carried out. Therefore, the Qmatrix/QP decision section 41 adopts what the encoding process of the first-pass pre-encoder 20 has estimated. By contrast, if the input image is a non-original image that has already undergone the encoding process, the Qmatrix/QP decision section 41 adopts what the back search section 30 has detected in order to prevent the repetition of quantization distortion.

Moreover, the quantization parameter QP and the quantization matrix Qmatrix that were detected by the back search section 30 and that were used in the previous encoding process are also supplied to the intra image prediction mode detection section 33. The intra image prediction mode detection section 33 uses the quantization parameter QP and the quantization matrix Qmatrix to detect the previous intra image prediction mode by performing the above-mentioned intra image prediction mode detection process. Incidentally, the procedure of the intra image prediction mode detection process by the intra image prediction mode detection section 33 will be detailed later. This previous prediction mode is transmitted to the intra image prediction mode decision section 45. The intra image prediction mode decision section 45 makes a determination as to whether to adopt the first prediction mode in which the offset-attached sum of absolute difference SAD becomes the smallest in the first pass encoding or the previous prediction mode detected by the intra image prediction mode detection section 33.

That is, the intra image prediction mode detection section 33, based on the quantization parameter QP and the quantization matrix Qmatrix, detects the previous prediction mode. This previous prediction mode is transmitted to the intra image prediction mode decision section 45. The intra image prediction mode decision section 45 makes a determination as to whether to adopt the first prediction mode in which the sum of absolute difference SAD becomes the smallest in the first pass encoding or the previous prediction mode detected by the intra image prediction mode detection section 33.

That is, if the input image data are an original image that has not yet undergone the encoding process, the intra image prediction mode decision section 45 adopts what the offset-attached Intra prediction mode decision section 21 has estimated because the encoding process has not yet been performed and therefore the detection of the intra image prediction mode (back search) will fail. By contrast, if the input image is a non-original image that has already undergone the encoding process, the intra image prediction mode decision section 45 adopts what the intra image prediction mode detection section 33 has detected in order to prevent the repetition of quantization distortion.

The second pass parameter encoder 50, as described above, uses the quantization matrix Qmatrix and the quantization parameter QP that were determined by the Qmatrix/QP decision section 41, and the intra image prediction mode determined by the intra image prediction mode decision section 45 to encode the input image, and outputs it as an encoding stream (Stream).

More specifically, the intra image prediction processing section 51 selects the intra image prediction mode determined by the intra image prediction mode decision section 45 as an appropriate intra image prediction mode, generates the difference image data from the input image by using the prediction image of the surrounding pixels, and inputs the difference image data into the integer DCT section 52. The integer DCT section 52 performs orthogonal transformation by discrete cosine transform in order to output the difference image data as the DCT coefficient W. After receiving the DCT coefficient W, the quantization section 53 carries out quantization with the quantization matrix Qmatrix and the quantization parameter QP that were determined by the Qmatrix/QP decision section 41, and transmits the quantization level Z to the entropy encoding section 54. The entropy encoding section 54 performs binarization and arithmetic encoding for the input quantization level Z, and outputs it as an encoding stream.

(3-3) Intra Image Prediction Mode Detection Process

The following describes the prediction mode detection process by the intra image prediction mode detection section 33 of the encoding device 10 of the second embodiment of the present invention, with reference to a flowchart of FIG. 14, which illustrates the procedure RT4 of the intra image prediction mode detection process. This also corresponds to an image information encoding method of the present embodiment.

First, the intra image prediction mode detection section 33 determines the intra image prediction mode whose sum of absolute difference (i.e. the sum of absolute values of the difference image data) from the prediction image is the smallest as an initial value (step S151). Subsequently, the intra image prediction mode detection section 33 performs the DCT process for the difference image data from the prediction image (step S152). The intra image prediction mode detection section 33 calculates, for each sample in the 4×4 sub macro block, the residue r by dividing the 6-bit-shifted absolute value |W| (|W|<<6) of the DCT coefficient W by RF (step S153).

Then, the intra image prediction mode detection section 33 determines the result of multiplying the sum of residues r by an even number of the DCT coefficient as the evaluation value Y (step S156).

Subsequently, the intra image prediction mode detection section 33 makes a determination as to whether Ys have been calculated for all the intra image prediction modes that may possibly not have images (step S157). If the evaluation values Y have not been calculated for them, the intra image prediction mode detection section 33 replaces the current prediction mode with the prediction mode having the second smallest sum of absolute difference SAD (step S158), and repeats the processes of step S52 to S57. Then, if the intra image prediction mode detection section 33 determines that Ys have been calculated for all the possible intra image prediction modes (Yes at step S157), the intra image prediction mode detection section 33 then compares the evaluation values Y of the intra image prediction modes (step S159), determines the intra image prediction mode having the smallest evaluation value Y as the prediction mode used in the previous process (step S160), and ends the process.

As described above, according to the first embodiment of the present invention, the encoding device 10 arithmetically detects the intra image prediction mode used in the previous encoding process and therefore prevents the repetition of quantization distortion during the dubbing process of AVC intra frames. Therefore, the encoding device 10 can prevent the decline in SN ratio and visual performance during dubbing.

Furthermore, when comparing the intra image prediction modes by using their sums of absolute difference SAD from the prediction images in the sub macro blocks, the encoding device 10 starts to choose the intra image prediction modes whose sums of absolute difference SAD are smaller than the rest and compare them. This means that the encoding device 10 starts to compare the intra image prediction modes that were more certainly used in the previous encoding process than the others. For example, if calculation starts with the smallest intra image prediction mode and is eventually carried out only for a certain number of the intra image prediction modes (three, for example), this reduces the amount of calculation. Moreover, by introducing the transformation matrix D, the encoding device 10 can equally deal with the DCT coefficients of the encoding process and the DCT coefficients of the decoding process.

In addition to that, whatever the intra image prediction algorithm of the previous encoding process was, the detection process can be carried out by the encoding device 10. So even if an intra image prediction method that takes into account visual performance is used in the first encoding process, this algorithm can be used during dubbing.

(3-4) Operation and Effect

According to the above configuration, the encoding device 11 detects, from the difference image data whose offset-added sum of absolute difference SADf is the smallest, the quantization parameter QP and the quantization matrix Qmatrix that are quantization factors and on which the quantization step used in the previous encoding process is based.

By using a division factor based on the quantization parameter QP and the quantization matrix Qmatrix that were detected by back search, and in ascending order of the offset-added sums of absolute difference, the encoding device 11 divides three difference image data sets (the number of data sets, or three, is a target number) to calculate the residue value r.

Then, the encoding device 11 assumes that the intra image prediction mode in which the difference image data item having the smallest residue value r was generated is the intra image prediction mode for the difference image data item.

Therefore, the encoding device 11 can certainly detect the intra image prediction mode used in the previous encoding process, thereby further suppressing the decline in video quality during dubbing.

According to the above configuration, the encoding device 11 performs the offset preference application process to give priority to the specific intra image prediction modes when ranking them, thereby almost certainly ensuring that the three intra image prediction modes, which are the targets of the intra image prediction mode detection process, contain the intra image prediction mode used in the previous encoding process.

That almost certainly ensures that the encoding device 11 detects the intra image prediction mode used in the previous encoding process by performing the intra image prediction mode detection process. Therefore, according to the present invention, the image processing device and the image processing method that are capable of suppressing the decline in visual quality during encoding can be realized.

(4) Other Embodiments

Figure 17:
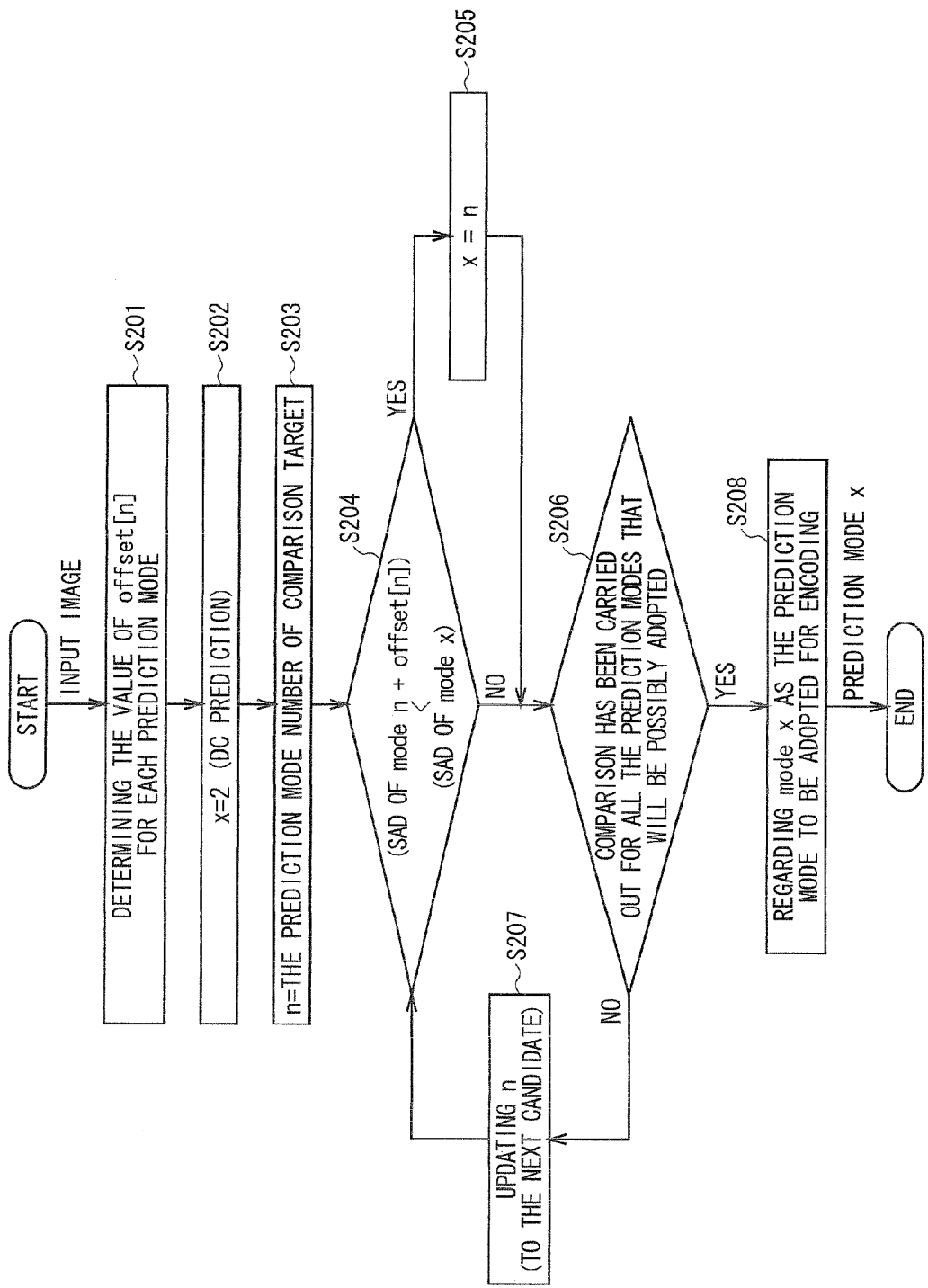
FIG. 17 is a flowchart detailing an offset preference application process according to another embodiment of the present invention.

With reference to a flowchart of FIG. 17, the following details the procedure RT5 of the offset preference application process by an encoding device according to another embodiment of the present invention.

When the input image data are input, the offset-attached Intra prediction mode decision section determines the value of offset[n] for each prediction mode (step S201). Here, n represents the prediction mode numbers (0 to 8 (except 2)) to be compared with DC prediction. Subsequently, the offset-attached Intra prediction mode decision section sets x=2 (setting DC prediction mode) (step S202), and assigns a comparison-target intra image prediction mode number to n (step S203). Here, x represents the prediction mode number to be adopted for encoding.

Subsequently, the offset-attached Intra prediction mode decision section makes a determination as to whether the sum of the sum of absolute difference SAD of the comparison-target intra image prediction mode plus offset[n] is less than the sum of absolute difference SAD of DC prediction mode (step S204).

At step S204, if the offset-attached Intra prediction mode decision section determines that the offset-added sum of absolute difference SADf, or the result of adding the sum of absolute difference SAD of the comparison-target intra image prediction mode and offset[n], is less than the offset-added sum of absolute difference SADf of the mode number x (Yes at step S204), the offset-attached Intra prediction mode decision section substitutes the mode number n of the comparison-target intra image prediction mode for x, and proceeds to step S205.

By contrast, if the offset-attached Intra prediction mode decision section determines that the offset-added sum of absolute difference SADf, or the result of adding the sum of absolute difference SAD of the comparison-target intra image prediction mode and offset[n], is not less than the offset-added sum of absolute difference SADf of the mode number x (No at step S204), the offset-attached Intra prediction mode decision section makes a determination as to whether comparison has been carried out for all the prediction modes that will possibly be adopted (step S205). If determination has not yet been done for all of them (No at step S205), the offset-attached Intra prediction mode decision section updates the value n (step S206), and carries but comparison of step S5 for the next candidate mode.

If the offset-attached Intra prediction mode decision section determines, at step S205, that comparison has been carried out for all the prediction modes that will possibly be adopted, the offset-attached Intra prediction mode decision section determines Mode x as the prediction mode to be adopted for encoding (step S207), and ends a series of processes.

Moreover, the encoding device selects the intra image prediction mode having the smallest sum of absolute difference SAD, and compares the sum of absolute difference SAD of the selected intra image prediction mode and the sum of absolute difference SAD of one of the intra image prediction modes, or a preference prediction mode (DC prediction mode). Then, if the difference between the sums of absolute difference SAD is less than a threshold, the encoding device may determine the difference image data item corresponding to the sum-of-absolute-difference preference prediction mode as the difference image data item for which the actual encoding process is carried out.

Moreover, in the above-mentioned first and second embodiments, ranking is carried out based on the sums of absolute difference SAD. However, the present invention is not limited to this. For example, by using SATD (Sum of Absolute Transformed Difference), which is obtained after Hadamard transform is carried out for the sum of absolute difference SAD to calculate the sum of absolute values, or SSD (Sum of Square Difference), the ranking may be carried out.

Furthermore, in the above-mentioned first and second embodiments, offset[n] is not added to only DC prediction mode. However, the present invention is not limited to this. Offset[n] may not be added to other intra image prediction modes. Moreover, according to the present invention, offset[n] may not be added to two or more intra image prediction modes.

Furthermore, in the above-mentioned first and second embodiments, a different value of offset[n] is added to each intra image prediction mode. However, the present invention is not limited to this. The same value of offset[n] may be added to them.

Furthermore, in the above-mentioned first and second embodiments, the value of offset[n] to be added is determined depending on how far the quality of video has declined. However, the present invention is not limited to this. For example, the value of offset[n] to be added may be determined depending on how much codes have been generated. Moreover, an indicator for adding offset[n] is not necessarily required.

Furthermore, in the above-mentioned first and second embodiments, the encoding device performs both the back search process and the offset preference application process. However, the present invention is not limited to this. The encoding device may perform only the offset preference application process. In this case, the integer DCT section 22 supplies the DCT coefficient to a quantization parameter calculation section (not shown). The quantization parameter calculation section determines an appropriate quantization parameter QP depending on the magnitude of this DCT coefficient W and the distribution state of frequency ranges, supplies it to the quantization section 53, and outputs it through the entropy encoding section 54 as an encoding stream.

Furthermore, in the above-mentioned second embodiment, the encoding device carries out the intra image prediction mode detection process for the three intra image prediction modes (this "three" is the number of modes to be processed). However, the present invention is not limited to this. There is no limitation on the number of modes to be processed.

Furthermore, in the above-mentioned first and second embodiments, the sum of absolute difference SAD is calculated for each intra encoding unit, which is made of a 4×4-pixel sub macro block. However, the present invention is not limited to this. There is no limitation on the intra encoding unit: it may be 8×8 or 16×8 pixels.

Furthermore, in the above-mentioned first and second embodiments, the encoding device performs processes according to the AVC standard. However, the present invention is not limited to this. The present invention can be applied to all methods that select one intra image prediction mode from among a plurality of intra image prediction modes.

Furthermore, in the above-mentioned first and second embodiments, the encoding devices 10 and 11, which serve as an image processing device, includes the offset-attached Intra prediction mode decision section 21, which serves as a difference image data generation section and a ranking section. However, the present invention is not limited to this. The image processing device of the present invention may contain the difference image data generation section and the ranking section, which are configured in various other ways.

The above describes the embodiments of the present invention, but this does not limit the scope of the present invention. Various modifications and alterations may occur insofar as they are within the scope of the appended claims or the equivalents thereof.

For example, the above-noted image information encoding processing devices and methods of the first and second embodiments may be realized by computer programs; these may be realized as a storage medium on which the programs is recorded. Even in such cases, the above-mentioned effects can be obtained.

DESCRIPTION OF SYMBOLS

2 . . . First Encoding Section, 3 . . . Back Search Section, 4 . . . Second Encoding Section, 5 . . . Prediction Mode Detection Section, 6 . . . QMatrix Detection Section, 7 . . . QP Detection Section, 20 . . . Pre-Encoder, 21 . . . Offset-Attached Intra Prediction Mode Decision Section, 22 . . . Integer DCT Section, 23 . . . Quantization Section, 24 . . . Entropy Calculation Section, 30 . . . Back Search Section, 31 . . . QMatrix Detection Section, 32 . . . QPDetection Section, 33 . . . Intra Image Prediction Mode Detection Section, 40 . . . Amount-Of-Codes Control Section, 41 . . . QMatrix/QP Decision Section, 45 . . . Intra Image Prediction Mode Decision Section, 50 . . . Parameter Encoder, 51 . . . Intra Image Prediction Processing Section, 52 . . . Integer Dot Section, 53 . . . Quantization Section, 54 . . . Entropy Encoding Section

The invention claimed is:

1. An image processing device comprising:
a difference image data generation section that generates, for each of a plurality of predetermined intra image prediction modes, a difference image data item containing a difference value from pixels surrounding a process-target pixel to be processed;
a ranking section that ranks the intra image prediction modes in ascending order of the sum of differences that is based on a generated codes amount of the difference image data item;
a back search section that detects, from the difference image data item ranked highest by the ranking section, a quantization factor on which a quantization step used in the previous encoding process is based;
a residue value calculation section that calculates a residue value at the time of dividing a target number of difference image data items in descending order of rank by the ranking section by using a scaling factor that is calculated based on the quantization factor detected by the back search section; and
an intra image prediction mode decision section that determines the intra image prediction mode in which the difference image data item having the smallest residue value was generated as the intra image prediction mode for the image data item.

2. The image processing device according to claim 1, wherein
the ranking section calculates the sum of differences based on the generated codes amount and a preference order set in advance for the intra image prediction mode.

3. The image processing device according to claim 2, wherein
the ranking section includes:
an offset addition section that generates the sum of differences by adding an offset depending on the intra image prediction modes to generated codes amounts of a plurality of the difference image data items; and
a difference sum value comparison section that ranks the intra image prediction modes in ascending order of the sum of differences by comparing the sum of differences.

4. The image processing device according to claim 3, wherein
the offset addition section does not add the offset to one intra image prediction mode in which decline in video quality is small, among a plurality of the intra image prediction modes.

5. The image processing device according to claim 4, wherein
the one intra image prediction mode in which decline in video quality is small is the intra image prediction mode having a difference value from the average of the surrounding pixels.

6. The image processing device according to claim 5, wherein:
the image processing device supports the AVC standard; and
the one intra image prediction mode in which decline in video quality is small is Mode 2 that takes a difference value from the average of the surrounding pixels in vertical and horizontal directions.

7. The image processing device according to claim 6, wherein
the offset addition section sets the offset so as to be small for intra image prediction modes having a small degree of decline in video quality and large for intra image prediction modes having a large degree of decline in video quality.

8. The image processing device according to claim 1, wherein
the number of things to be processed is three.

9. The image processing device according to claim 3, wherein
the offset addition section sets, as the offset, a large value when the estimated number of dubbing is large and a small value when the estimated number of dubbing is small.

10. The image processing device according to claim 2, wherein
when the quantization factor is not detected by the back search section, the intra image prediction mode decision section determines the intra image prediction mode at the time of generating difference image data item in which the sum of differences is the smallest as the intra image prediction mode encoding the image data item.

11. The image processing device according to claim 1, wherein
when the quantization factor is not detected by the back search section and deference in the sum of differences of the intra image prediction mode ranked second or more with respect to the intra image prediction mode ranked first by the ranking section is small, the intra image prediction mode decision section determines one intra image prediction mode in which decline in video quality is small as the intra image prediction mode for the image data item.

12. An image processing method comprising:
a difference image data generation step of generating, for each of a plurality of predetermined intra image prediction modes, a difference image data item containing a difference value from pixels surrounding a process-target pixel to be processed;
a ranking step of ranking the intra image prediction modes in ascending order of the sum of differences that is based on a generated codes amount of the difference image data item;
a back search step of detecting, from the difference image data item ranked highest by the ranking section, a quantization factor on which a quantization step used in the previous encoding process is based;
a residue value calculation step of calculating a residue value at the time of dividing a target number of difference image data items in descending order of rank by the ranking section by using a scaling factor that is calculated based on the quantization factor detected by the back search section; and
an intra image prediction mode decision step of determining the intra image prediction mode in which the difference image data item having the smallest residue value was generated as the intra image prediction mode for the image data item.

* * * * *